United States Patent
Nakayama

(10) Patent No.: US 10,242,410 B2
(45) Date of Patent: Mar. 26, 2019

(54) STORAGE MEDIUM, IMAGE PROCESSING METHOD AND IMAGE PROCESSING APPARATUS

(71) Applicant: BROTHER KOGYO KABUSHIKI KAISHA, Nagoya-shi, Aichi-ken (JP)

(72) Inventor: Tomofumi Nakayama, Tokoname (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 558 days.

(21) Appl. No.: 14/980,502

(22) Filed: Dec. 28, 2015

(65) Prior Publication Data

US 2016/0189314 A1 Jun. 30, 2016

(30) Foreign Application Priority Data

Dec. 26, 2014 (JP) .................................. 2014-263768

(51) Int. Cl.
G06Q 40/00 (2012.01)
G06K 9/00 (2006.01)

(52) U.S. Cl.
CPC ......... *G06Q 40/12* (2013.12); *G06K 9/00449* (2013.01); *G06K 2209/01* (2013.01)

(58) Field of Classification Search
None
See application file for complete search history.

(56) References Cited

U.S. PATENT DOCUMENTS

| | | | | |
|---|---|---|---|---|
| 6,173,264 B1 * | 1/2001 | Kurzweil | ............... | G09B 5/065 704/260 |
| 8,306,880 B1 * | 11/2012 | Fitch | ....................... | G06Q 30/06 705/16 |
| 2004/0083134 A1 | 4/2004 | Spero et al. | | |

FOREIGN PATENT DOCUMENTS

| | | | |
|---|---|---|---|
| JP | 2004164218 A | 6/2004 | |
| JP | 2004166062 A | 6/2004 | |
| JP | 2006511896 A | 4/2006 | |
| JP | 5385349 B2 | 1/2014 | |

OTHER PUBLICATIONS

Neatworks, 2008, available at https://lib.store.yahoo.net/lib/shoptronics/neatreceiptsmanual.pdf.*
Review: NeatDesk and NeatWorks for Mac, 2009, https://unclutterer.com/2009/06/08/review-neatdesk-and-neatworks-for-mac/.*

* cited by examiner

*Primary Examiner* — Allen C Chein
(74) *Attorney, Agent, or Firm* — Scully, Scott, Murphy & Presser, P.C.

(57) ABSTRACT

An image processing apparatus which acquires character string information and position information of the character string in a receipt image by an Optical Character Recognition (OCR), acquires value information corresponding to a keyword corresponding to predetermined item information from the acquired character string information, associates and stores the acquired value information, position information corresponding to the acquired value information and the predetermined item information, displays the receipt image and an object at a position of the receipt image corresponding to the stored position information, selects, in a case where it is determined that same type value information which is a plurality of the value information associated with a same type of the item information is stored, processing to be executed in accordance with a type of the item information related to the same type value information, and executes the selected processing.

11 Claims, 18 Drawing Sheets

| | | | | POSITION INFORMATION | | |
|---|---|---|---|---|---|---|
| RP-ID | R-ID | ITEM INFORMATION | VALUE INFORMATION | START COORDINATES | END COORDINATES | SELECTION FLAG |
| RP0001 | R0001 | STORE | XXXX Store | (68, 8) | (166, 25) | FALSE |
| RP0002 | R0001 | TAX | $3.48 | (175, 304) | (206, 317) | FALSE |
| RP0003 | R0001 | TAX | $0.55 | (175, 321) | (206, 333) | FALSE |
| RP0004 | R0001 | DATE | 10/28/2014 | (6, 90) | (119, 103) | TRUE |
| RP0005 | R0001 | DATE | 10/28/2014 | (101, 518) | (227, 532) | FALSE |
| RP0006 | R0001 | PAYMENT TYPE | BBB Card | (6, 366) | (33, 378) | FALSE |
| RP0007 | R0001 | AMOUNT OF MONEY | $49.26 | (169, 335) | (206, 348) | FALSE |
| RP0008 | R0003 | STORE | Road ZZZZ | (52, 10) | (147, 21) | FALSE |
| RP0009 | R0003 | AMOUNT OF MONEY | $20.23 | (64, 51) | (112, 63) | FALSE |
| RP0010 | R0003 | PAYMENT TYPE | Master Card | (63, 59) | (141, 73) | FALSE |
| RP0011 | R0003 | DATE | 2014/11/3 | (126, 76) | (209, 85) | FALSE |
| : | : | : | : | : | : | : |

```
          XXXX Store
   000 North Germantown Parkway,
          Cordova, TN 38018
           (000)000-0000

10/28/2014 04:15PM
------------------------------------
Banana                        $0.67
Aerosol                       $0.98
Yuengling Beer               $11.64
Yuengling Beer               $11.64
Cheese                        $3.48
Peanuts                       $3.18
Tooth Brush                   $7.88
Cookie                        $2.78
Snacks                        $1.00
Envelope                      $1.97
------------------------------------
Subtotal                     $45.22
         Tax1 9.250%          $3.48
         Tax2 7.250%          $0.55
Total                        $49.25

BBB Card                     $49.25
 #···· ···· ···· 0000

------------------------------------

Thank you for shopping

Terminal:1234 10/28/2014 04:15:12PM
```

FIG. 3

| Date | Vendor | Payment Type | Category | Amount | Sales Tax |
|---|---|---|---|---|---|
| 2014/10/28 | XXXX Store | BBB Card | Meals/Restaurant | $49.25 | $4.03 |
| 2014/11/2 | Super YYYY | Cash | Grocery Store | $13.59 | $0.99 |
| 2014/11/3 | Road ZZZZ | CCC Card | Fuel/Auto | $20.23 | $0.00 |

Date: 10/28/2014

Payment Type: BBB Card

Amount: $49.25

Vendor: XXXX Store

Category: Meals/Restaurant

Sales Tax: $4.03

---

XXXX Store
000 North Germantown Parkway,
Cordova, TN 38018
(000)000-0000

10/28/2014 04:15PM

| | |
|---|---|
| Banana | $0.67 |
| Aerosol | $0.98 |
| Yuengling Beer | $11.64 |
| Yuengling Beer | $11.64 |
| Cheese | $3.48 |
| Peanuts | $3.18 |
| Tooth Brush | $7.88 |
| Cookie | $2.78 |
| Snacks | $1.00 |
| Envelope | $1.97 |

Subtotal: $45.22
Tax1 9.250% $3.48
Tax2 7.250% $0.65
Total: $49.25

BBB Card $49.25
.... .... (XXX)

Thank you for shopping

Terminal:1234 10/28/2014 04:15:12PM

| ITEM INFORMATION | KEYWORD | TYPE OF ITEM INFORMATION |
|---|---|---|
| STORE | Store | SECOND TYPE (SELECTION) |
| STORE | Super | SECOND TYPE (SELECTION) |
| STORE | Road | SECOND TYPE (SELECTION) |
| TAX | tax1 | FIRST TYPE (SUM) |
| TAX | tax2 | FIRST TYPE (SUM) |
| DATE | \*\*/\*\*/\*\*\*\* | SECOND TYPE (SELECTION) |
| PAYMENT TYPE | BBB Card | SECOND TYPE (SELECTION) |
| PAYMENT TYPE | CCC Card | SECOND TYPE (SELECTION) |
| AMOUNT OF MONEY | Total | — |
| ⋮ | ⋮ | ⋮ |

FIG. 5

| R-ID | DATE | STORE | PAYMENT TYPE | CATEGORY | AMOUNT OF MONEY | TAX | IMAGE DATA |
|---|---|---|---|---|---|---|---|
| R0001 | 2014/10/28 | XXXX Store | BBB Card | Meals/Restaurant | $49.25 | $4.03 | IMAGE DATA D1 |
| R0002 | 2014/11/2 | Super YYYY | cash | Grocery Store | $13.59 | $0.99 | NONE |
| R0003 | 2014/11/3 | Road ZZZZ | CCC card | Fuel/Auto | $20.23 | $0 | THE IMAGE DATA D2 |
| ... | ... | ... | ... | ... | ... | ... | ... |

| RP-ID | R-ID | ITEM INFORMATION | VALUE INFORMATION | POSITION INFORMATION | | SELECTION FLAG |
| --- | --- | --- | --- | --- | --- | --- |
| | | | | START COORDINATES | END COORDINATES | |
| RP0001 | R0001 | STORE | XXXX Store | (68, 8) | (166, 25) | FALSE |
| RP0002 | R0001 | TAX | $3.48 | (175, 304) | (206, 317) | FALSE |
| RP0003 | R0001 | TAX | $0.55 | (175, 321) | (206, 333) | FALSE |
| RP0004 | R0001 | DATE | 10/28/2014 | (6, 90) | (119, 103) | TRUE |
| RP0005 | R0001 | DATE | 10/28/2014 | (101, 518) | (227, 532) | FALSE |
| RP0006 | R0001 | PAYMENT TYPE | BBB Card | (6, 366) | (33, 378) | FALSE |
| RP0007 | R0001 | AMOUNT OF MONEY | $49.25 | (169, 335) | (206, 348) | FALSE |
| RP0008 | R0003 | STORE | Road ZZZZ | (52, 10) | (147, 21) | FALSE |
| RP0009 | R0003 | AMOUNT OF MONEY | $20.23 | (64, 51) | (112, 63) | FALSE |
| RP0010 | R0003 | PAYMENT TYPE | Master Card | (63, 59) | (141, 73) | FALSE |
| RP0011 | R0003 | DATE | 2014/11/3 | (126, 76) | (209, 85) | FALSE |
| ... | ... | ... | ... | ... | ... | ... |

FIG. 12

(d) 

| RP-ID | R-ID | ITEM INFORMATION | VALUE INFORMATION | POSITION INFORMATION | | SELECTION FLAG |
|---|---|---|---|---|---|---|
| | | | | START COORDINATES | END COORDINATES | |
| RP0001 | R0001 | STORE | XXXX Store | (68, 8) | (166, 25) | FALSE |
| RP0002 | R0001 | TAX | $3.48 | (175, 304) | (206, 317) | FALSE |
| RP0003 | R0001 | TAX | $0.55 | (175, 321) | (206, 333) | FALSE |
| RP0004 | R0001 | DATE | 10/28/2014 | (6, 90) | (119, 103) | FALSE |
| RP0005 | R0001 | DATE | 10/28/2014 | (101, 518) | (227, 532) | FALSE |
| RP0006 | R0001 | PAYMENT TYPE | BBB Card | (6, 366) | (33, 378) | FALSE |
| RP0007 | R0001 | AMOUNT OF MONEY | $49.25 | (169, 335) | (206, 348) | FALSE |

(e) 

| RP-ID | R-ID | ITEM INFORMATION | VALUE INFORMATION | POSITION INFORMATION | | SELECTION FLAG |
|---|---|---|---|---|---|---|
| | | | | START COORDINATES | END COORDINATES | |
| RP0001 | R0001 | STORE | XXXX Store | (68, 8) | (166, 25) | FALSE |
| RP0002 | R0001 | TAX | $3.48 | (175, 304) | (206, 317) | FALSE |
| RP0003 | R0001 | TAX | $0.55 | (175, 321) | (206, 333) | FALSE |
| RP0004 | R0001 | DATE | 10/28/2014 | (6, 90) | (119, 103) | TRUE |
| RP0005 | R0001 | DATE | 10/28/2014 | (101, 518) | (227, 532) | FALSE |
| RP0006 | R0001 | PAYMENT TYPE | BBB Card | (6, 366) | (33, 378) | FALSE |
| RP0007 | R0001 | AMOUNT OF MONEY | $49.25 | (169, 335) | (206, 348) | FALSE |

FIG. 13

| Date | Vendor | Payment Type | Category | Amount | Sales Tax |
|---|---|---|---|---|---|
| 2014/10/28 | XXXX Store | BBB Card | Meals/Restaurant | $49.25 | $4.03 |

XXXX Store
000 North Germantown Parkway,
Cordova, IN 38018
(000)000-0000
04:15PM

| Banana | $0.67 |
| Aerosol | $0.98 |
| Yuengling Beer | $11.64 |
| Yuengling Beer | $11.64 |
| Cheese | $3.48 |
| Peanuts | $3.18 |
| Tooth Brush | $7.88 |
| Cookie | $2.78 |
| Snacks | $1.00 |
| Envelope | $1.97 |

Subtotal                    $45.22
       Tax1 9.250%
       Tax2 7.250%
Total                       $49.25
BBB Card
............0000

Thank you for shopping

Terminal:1234       04:15:12PM

10/28/2014
BBB Card
$49.25

Category  Meals/Restaurant
$4.03

FIG. 15

ASSOCIATION DATA TABLE 93

(f) 93

| RP-ID | R-ID | ITEM INFORMATION | VALUE INFORMATION | POSITION INFORMATION | | SELECTION FLAG |
|---|---|---|---|---|---|---|
| | | | | START COORDINATES | END COORDINATES | |
| RP0001 | R0001 | STORE | XXXX Store | (68, 8) | (166, 25) | FALSE |
| RP0002 | R0001 | TAX | $3.48 | (175, 304) | (206, 317) | FALSE |
| RP0003 | R0001 | TAX | $0.55 | (175, 321) | (206, 333) | FALSE |
| RP0004 | R0001 | DATE | 10/28/2014 | (6, 90) | (119, 103) | FALSE |
| RP0005 | R0001 | DATE | 10/28/2014 | (101, 518) | (227, 532) | FALSE |
| RP0006 | R0001 | PAYMENT TYPE | BBB Card | (6, 366) | (33, 378) | FALSE |
| RP0007 | R0001 | AMOUNT OF MONEY | $49.25 | (169, 335) | (206, 348) | FALSE |

(g) 93

| RP-ID | R-ID | ITEM INFORMATION | VALUE INFORMATION | POSITION INFORMATION | | SELECTION FLAG |
|---|---|---|---|---|---|---|
| | | | | START COORDINATES | END COORDINATES | |
| RP0001 | R0001 | STORE | XXXX Store | (68, 8) | (166, 25) | FALSE |
| RP0002 | R0001 | TAX | $3.48 | (175, 304) | (206, 317) | FALSE |
| RP0003 | R0001 | TAX | $0.55 | (175, 321) | (206, 333) | FALSE |
| RP0004 | R0001 | DATE | 10/28/2014 | (6, 90) | (119, 103) | FALSE |
| RP0005 | R0001 | DATE | 10/28/2014 | (101, 518) | (227, 532) | TRUE |
| RP0006 | R0001 | PAYMENT TYPE | BBB Card | (6, 366) | (33, 378) | FALSE |
| RP0007 | R0001 | AMOUNT OF MONEY | $49.25 | (169, 335) | (206, 348) | FALSE | ately
STORAGE MEDIUM, IMAGE PROCESSING METHOD AND IMAGE PROCESSING APPARATUS

CROSS-REFERENCE TO RELATED APPLICATIONS

This application claims priority from Japanese Patent Application No. 2014-263768 filed on Dec. 26, 2014, the entire contents of which are incorporated herein by reference.

TECHNICAL FIELD

The present disclosure relates to a storage medium storing a program, an image processing method, and an image processing apparatus for displaying an image of a receipt.

BACKGROUND

An image processing apparatus displaying an image of a receipt has been known in related art. For example, in a system including an image capturing apparatus, when an image is captured, image data is converted into a text by Optical Character Recognition (OCR) and the like. Further, space information about a position of a text on the receipt is saved. In the text converted from the image data, terms of predetermined items such as 'amount of money', 'total sum' and 'billing amount' are searched. When the terms are found, values of a corresponding amount of money and the like are extracted. Then, an expense report using the extracted values is prepared. The expense report can be displayed on a display unit.

SUMMARY

According to an aspect of the disclosure, there is provided a non-transitory computer readable storage medium storing a program, when executed by a hardware processor, causing an image processing apparatus to perform: acquiring, from image data of a receipt image capturing a receipt, character string information which is information of a character string and position information which is information of a position of the character string in the receipt image by an Optical Character Recognition (OCR); storing association data in a storage unit, the storing comprising: acquiring value information which is information of a value corresponding to a keyword from the character string based on the acquired character string information, the keyword being a character string corresponding to predetermined item information; and storing, in the storage unit, the association data in which the acquired value information, position information corresponding to the acquired value information among the acquired position information, and the predetermined item information are associated; displaying, on a display unit capable of displaying an image, the receipt image based on the image data and a predetermined object at a position of the receipt image corresponding to the position information stored in the storage unit; determining whether same type value information is stored by referring to the association data stored in the storage unit, the same type value information being a plurality of the value information associated with the same type of the item information; selecting, in a case where it is determined that the same type value information is stored in the storage unit, processing to be executed from at least one of first processing and second processing in accordance with a type of the item information related to the same type value information; and executing the selected processing.

According to another aspect of the disclosure, there is provided an image processing method including: acquiring, from image data of a receipt image capturing a receipt, character string information which is information of a character string and position information which is information of a position of the character string in the receipt image by an Optical Character Recognition (OCR); storing association data in a storage unit, the storing comprising: acquiring value information which is information of a value corresponding to a keyword from the character string based on the acquired character string information, the keyword being a character string corresponding to predetermined item information; and storing, in the storage unit, the association data in which the acquired value information, position information corresponding to the acquired value information among the acquired position information, and the predetermined item information are associated; displaying, on a display unit capable of displaying an image, the receipt image based on the image data and a predetermined object at a position of the receipt image corresponding to the position information stored in the storage unit; determining whether same type value information is stored by referring to the association data stored in the storage unit, the same type value information being a plurality of the value information associated with the same type of the item information; selecting, in a case where it is determined that the same type value information is stored in the storage unit, processing to be executed from at least one of first processing and second processing in accordance with a type of the item information related to the same type value information; and executing the selected processing.

According to another aspect of the disclosure, there is provided an image processing apparatus including: a hardware processor; and a memory storing computer executable instructions, when executed by the hardware processor, causing the image processing apparatus to perform: acquiring, from image data of a receipt image capturing a receipt, character string information which is information of a character string and position information which is information of a position of the character string in the receipt image by an Optical Character Recognition (OCR); storing association data in a storage unit, the storing comprising: acquiring value information which is information of a value corresponding to a keyword from the character string based on the acquired character string information, the keyword being a character string corresponding to predetermined item information; and storing, in the storage unit, the association data in which the acquired value information, position information corresponding to the acquired value information among the acquired position information, and the predetermined item information are associated; displaying, on a display unit capable of displaying an image, the receipt image based on the image data and a predetermined object at a position of the receipt image corresponding to the position information stored in the storage unit; determining whether same type value information is stored by referring to the association data stored in the storage unit, the same type value information being a plurality of the value information associated with the same type of the item information; selecting, in a case where it is determined that the same type value information is stored in the storage unit, processing to be executed from at least one of first processing and second processing in accordance with a type of the item information related to the same type value information; and executing the selected processing.

BRIEF DESCRIPTION OF DRAWINGS

FIG. 2 illustrates a receipt 31;

FIG. 3 illustrates a management image 51;

FIG. 5 shows a receipt data table 92;

FIG. 6 shows an association data table 93;

FIG. 12 is a continuation of the state transition diagram in FIG. 11;

FIG. 13 illustrates the management image 51 in which markers 951 to 957 are displayed;

FIG. 15 is a continuation of the state transition diagram in FIG. 12;

DETAILED DESCRIPTION

On a receipt, for example, a value of date may be described at two positions and a value of a tax amount may be described at two positions. That is, the value of the same type of an item may be described at a plurality of positions. However, in a system of related art, processing that is to be executed in a case where the values of the same type of an item are acquired from the plurality of positions is not defined. Therefore, there is a possibility that it is not possible to obtain a user's desired result.

It is therefore an object of the disclosure to provide a storage medium storing a program, an image processing method, and an image processing apparatus capable of processing a value of a same type of an item acquired from a plurality of positions on a receipt.

Figure 1:
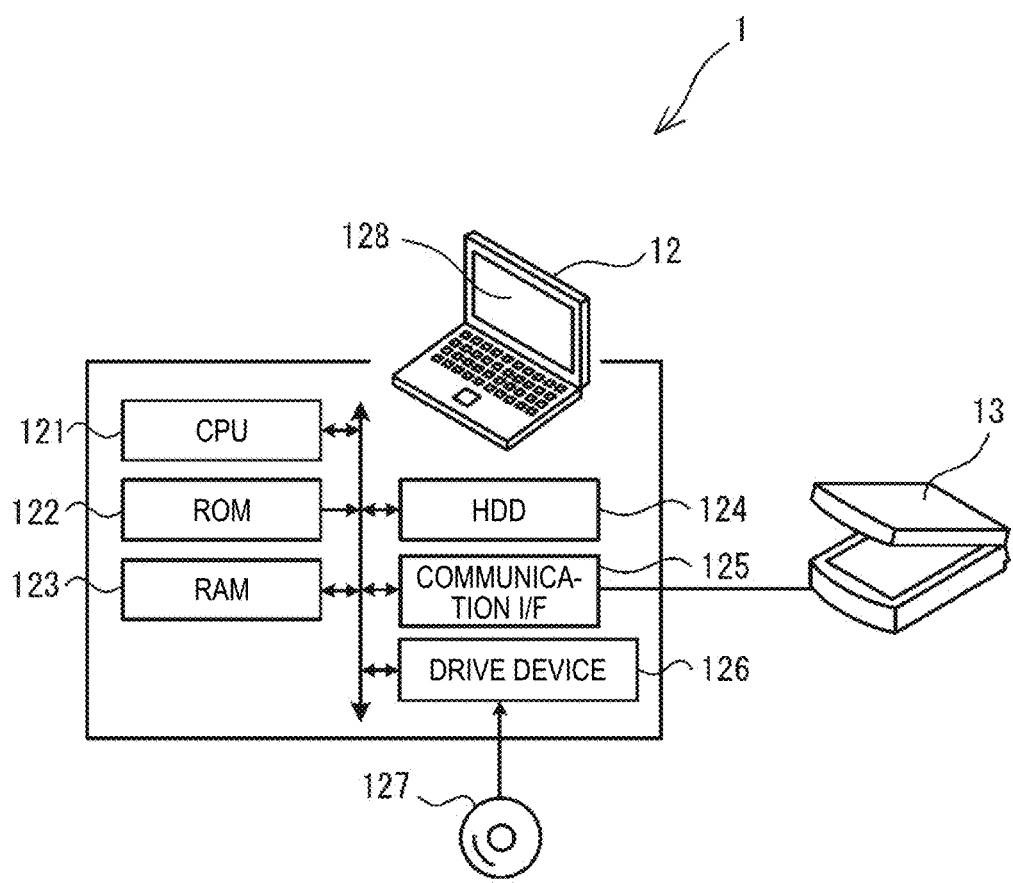
FIG. 1 shows an outline of an image processing system 1 and an electrical configuration of a PC 12.

Hereinafter, an illustrative embodiment of the present disclosure will be described. An image processing system 1 is described with reference to FIG. 1. The image processing system 1 includes a PC 12, which is a general-purpose computer, and a scanner apparatus 13. The PC 12 and the scanner apparatus 13 are connected to each other by a communication interface (communication I/F) 125 by a hard-wired connection method. The communication I/F conforms to a predetermined standard such as a Universal Serial Bus (USB), for example. In the meantime, the aspect of connection between the PC 12 and the scanner apparatus 13 is not particularly limited, and may be made by a network such as a Local Area Network (LAN), a Wide Area Network (WAN) and a wireless method (Bluetooth™, Wi-Fi and the like), for example.

An electrical configuration of the PC 12 is described. The PC 12 has a CPU 121, a display 128, a ROM 122, a RAM 123, an HDD 124, the communication interface (I/F) 125 and a drive device 126. The CPU 121 controls the PC 12. The display 128 can display an image on the basis of an instruction of the CPU 121. The CPU 121 is electrically connected to the ROM 122, the RAM 123, the HDD 124, the communication interface (I/F) 125 and the drive device 126. In the ROM 122, a boot program, a BIOS and the like are stored. In the RAM 123, temporary data is stored.

In the HDD 124, programs for enabling the CPU 121 to execute main processing (see FIG. 7) and change processing (see FIG. 14), and an OS are stored. The HDD 124 is an example of a non-transitory storage medium. The non-transitory storage medium may be any storage medium capable of storing the information, irrespective of a time period in which the information is stored. The non-transitory storage medium may not include a transitory storage medium (for example, a signal to be transmitted). The storage unit 114 may be configured by other non-transitory medium, for example, a flash memory and/or a ROM.

The main processing (see FIG. 7) and the change processing (see FIG. 14) are parts of processing of the household account management software for managing a household account. In the HDD 124, a keyword data table 91 (see FIG. 4, which will be described later), a receipt data table 92 (see FIG. 5, which will be described later), and an association data table 93 (see FIG. 6, which will be described later) are stored. The communication I/F 125 is an interface device for connecting the PC 12 to an external apparatus such as the scanner apparatus 13. The CPU 121 transmits and receives data to and from the external apparatus such as the scanner apparatus 13 through the communication I/F 125. The drive device 126 can read out the information stored in the storage medium 127. The CPU 121 can read out the programs stored in the storage medium 127 by the drive device 126, and store the same in the HDD 124. The scanner apparatus 13 performs a reading operation of capturing an image such as a receipt 31 by an instruction from the PC 12, to form image data, and transmits the same to the PC 12.

Here, as the CPU 121, a general-purpose processor may be used. In this illustrative embodiment, the main processing (see FIGS. 7 and 8) and the change processing (see FIG. 14) are not limited to an example where they are executed by the CPU 121, and may be executed by another electronic component (for example, ASIC). Also, the main processing and the change processing may be processed distributingly by a plurality of electronic devices (i.e., a plurality of CPUs). A part or all of each of the main processing and the change processing may be executed by a server connected to a network (not shown). The programs of the main processing and the change processing may be downloaded from a predetermined server connected to the network and stored in the HDD 124, for example.

The receipt 31 is described with reference to FIG. 2. The receipt 31 is a receipt that is received from a store clerk in a case where a user does shopping at a store of which a store name is 'XXXX Store'. On the receipt 31, the information such as the store name 'XXXX Store', the date '10/28/2014', Tax1 '$3.48', Tax2 '$0.55', Total '$49.25', the payment type 'BBB Card' and the like is printed. Tax1 and Tax2 are taxes of which tax rates are different depending on the item of goods. Total is a total amount of payment. 'BBB Card' is a kind of a credit card.

Figure 16:
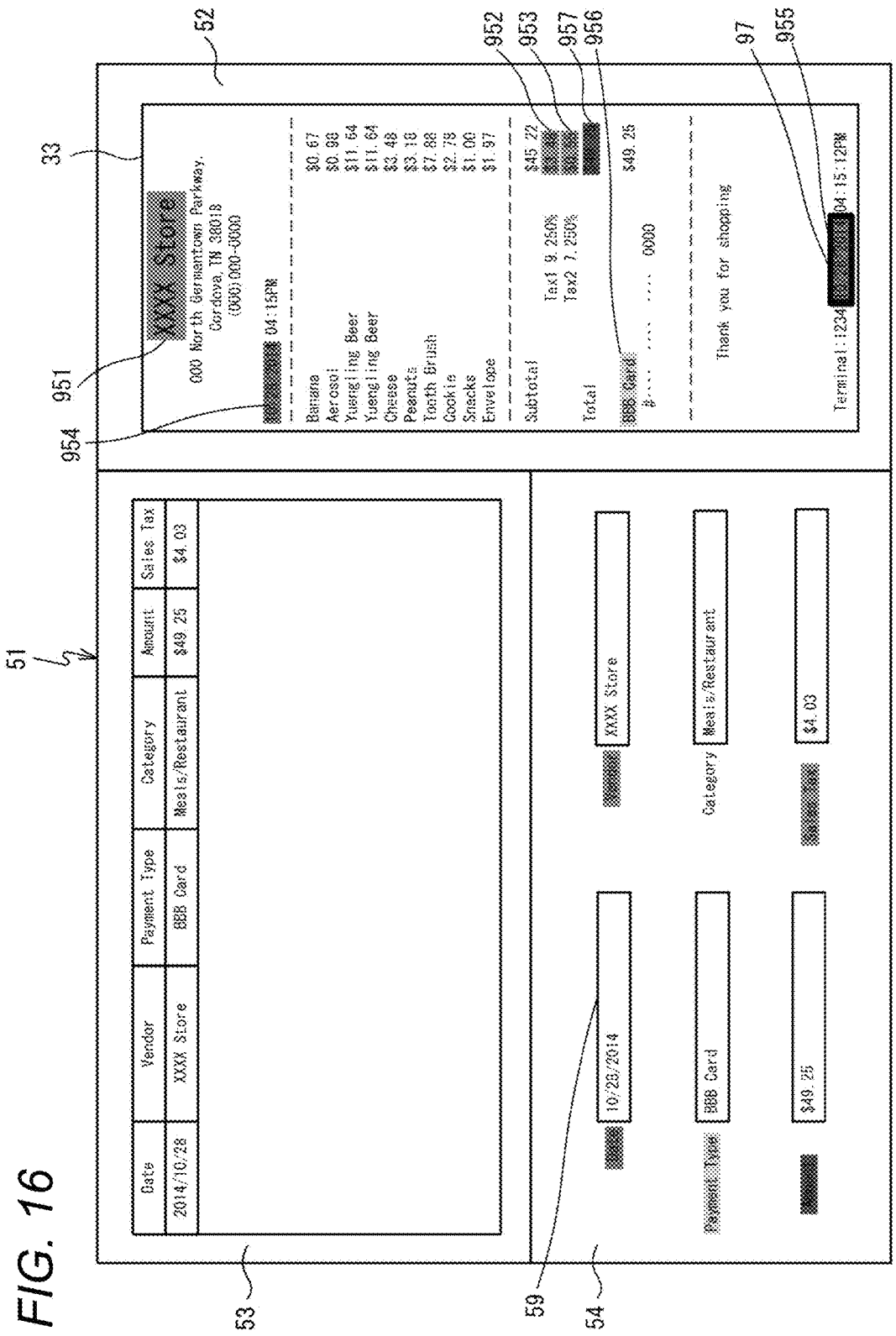
FIG. 16 illustrates the management image 51 at a state where a highlight object 97 is moved.

A management image 51 that is to be displayed on the display 128 (see FIG. 1) is described with reference to FIG. 3. In FIG. 3, a position in the upper and lower direction (a direction in which an information list display area 53 and an information editing area 54, to be described later, are arranged) of the management image 51 is a Y coordinate, and a position in the right and left direction is an X coordinate. The management image 51 is, for example, one of images that are to be displayed by the household account management software that manages a household account. Here, in the example of FIG. 3, markers 951 to 957 shown in FIG. 16 are not shown.

As shown in FIG. 3, the management image 51 has a receipt image display area 52, an information list display area 53, and an information editing area 54. The receipt image display area 52 is displayed at a right part of the management image 51. The receipt image display area 52 is an area in which a receipt image 33 based on image data D1 of the receipt 31 is to be displayed. The information list display area 53 is displayed at a left and upper part of the management image 51. The information list display area 53 is an area in which a list of the information about the receipt image 33 is to be displayed on the basis of a receipt data table 92 (see FIGS. 5 and 10, which will be described later). The information editing area 54 is displayed at a left and lower part of the management image 51. The information editing area 54 is an area in which the information about the receipt image 33 is displayed to be editable on the basis of the receipt data table 92 (see FIGS. 5 and 10, which will be described later).

Figure 4:
FIG. 4 shows a keyword data table 91.

The keyword data table 91 is described with reference to FIG. 4. In the keyword data table 91, predetermined item information, a keyword, and a type of the item information are associated and stored. The item information is information about an item that may be described on a variety of receipts. In the example of FIG. 4, as the item information, 'store', 'tax', 'date', 'payment type', 'amount of money' and the like are registered. The keyword is a character string corresponding to the item information. The type of the item information is preset on the basis of the processing that is to be executed by the CPU 121. In the example of FIG. 4, as the type of the item information, a first type and a second type are stored. The first type indicates sum processing that is to be executed in S28 (see FIG. 8, which will be described later). The second type indicates selection processing that is to be executed in S31 (see FIG. 8, which will be described later). The type of the item information may be flag information such as '1', '0' and the like. The processing of S28 and S31 will be described in detail later.

The item information 'store' is associated with the keyword 'Store', 'Super', and 'Road' and the type of the item information 'second type'. The item information 'tax' is associated with the keyword 'Tax1' and 'Tax2' and the type of the item information 'first type'. The item information 'date' is associated with the keyword '//****' and the type of the item information 'second type'. '*' of '//****' corresponds to any numeral indicating 'month/day/year' such as '10/28/2014', for example. The item information 'payment type' is associated with the keyword 'BBB Card' and 'CCC Card' and the type of the item information 'second type'. 'BBB Card' and 'CCC Card' indicate names of credit cards of different card companies. The item information 'amount of money' is associated with the keyword 'Total' and is not associated with the type of the item information.

The receipt data table 92 is described with reference to FIG. 5. The receipt data table 92 is a data table in which the information about the receipt is to be stored. In the receipt data table 92, an R-ID, a date, a store, a payment type, a category, an amount of money, a tax, and image data are associated and stored. The R-ID is an ID that is given to each receipt by the CPU 121 in a case where the information is stored in the receipt data table 92. The information associated with the R-ID 'R0001' and 'R0003' is information that is stored on the basis of image data D1, D2 of the receipt image by main processing described later. Instead of the image data D1, path information about the image data D1 saved in a predetermined folder may be associated. The information associated with the R-ID 'R0002' is information that is registered by a user operating the PC 12 while checking the receipt, unlike the main processing described later. For this reason, the R-ID 'R0002' is not associated with the image data. A process of storing the information in the receipt data table 92 on the basis of the image data in the main processing will be described later.

The association data table 93 is described with reference to FIG. 6. In the association data table 93, an RP-ID, an R-ID, the item information, value information, position information, and a selection flag are associated stored. The RP-ID is an ID that is given by the CPU 121 in a case where the information is stored in the association data table 93. The R-ID corresponds to the R-ID of the receipt data table 92. The position information is information of a position of a character string in the receipt image. The position information includes start coordinates and end coordinates. In the receipt image 33 (see FIG. 3), the start coordinates are coordinates of a left and upper end of the character string, and the end coordinates are coordinates of a right and lower end of the character string. A process of storing the information in the association data table 93 will be described later.

The main processing of the illustrative embodiment is described with reference to FIGS. 7 and 8. The main processing is processing of displaying the information described on the receipt in the management image 51 (see FIG. 13), based on the image data of the receipt image capturing the receipt. In the following, a case where the receipt 31 (see FIG. 2) is read by the scanner apparatus 13 and the management image 51 (see FIG. 13) is displayed is described as a specific example. In the specific example, a process of storing the information associated with the R-ID 'R0001' shown in FIGS. 5 and 6 at a state where the information is not stored in the receipt data table 92 and the association data table 93 and displaying the same in the management image 51 is described.

Figure 7:
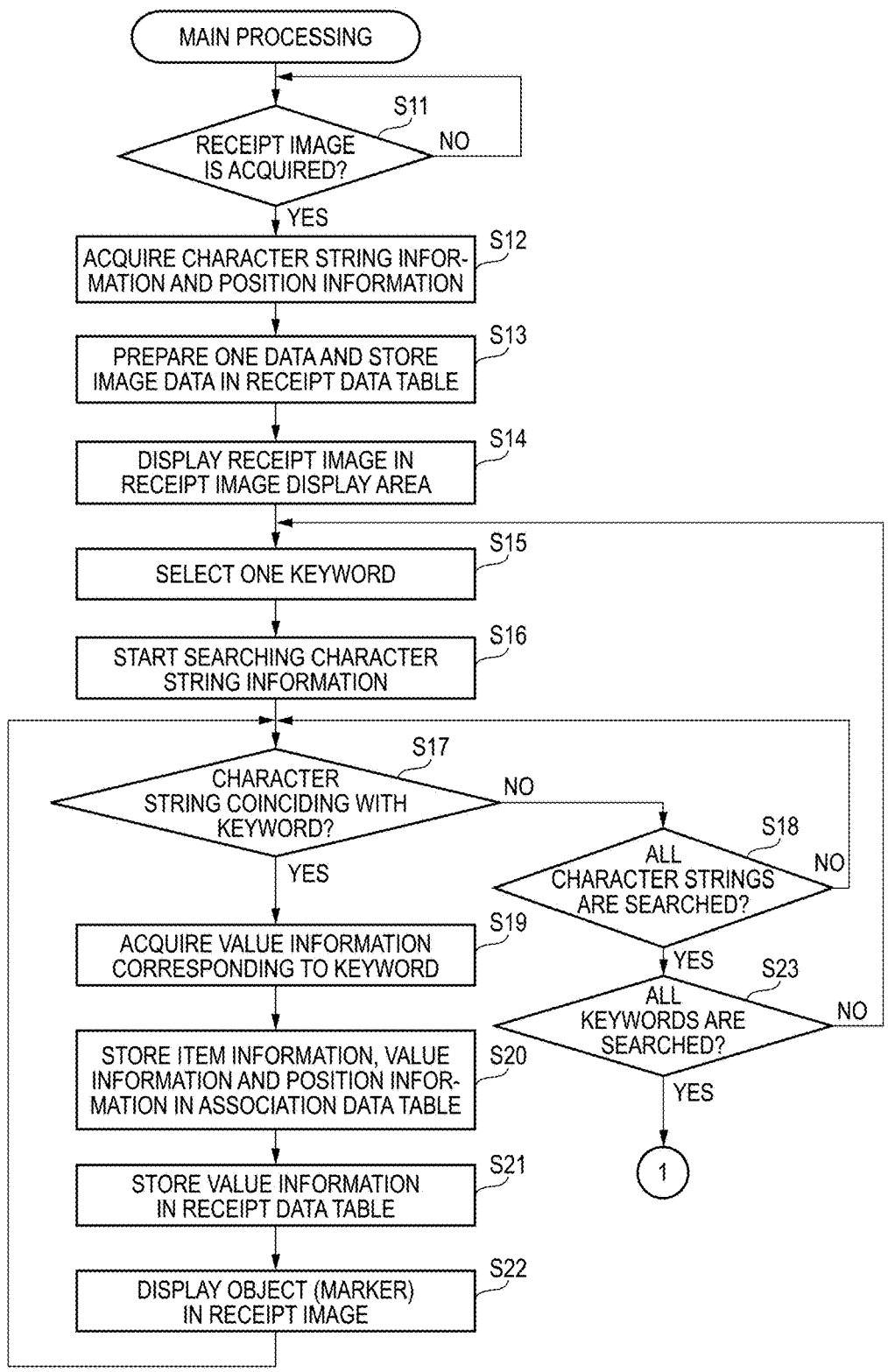
FIG. 7 is a flowchart of main processing.
Figure 8:
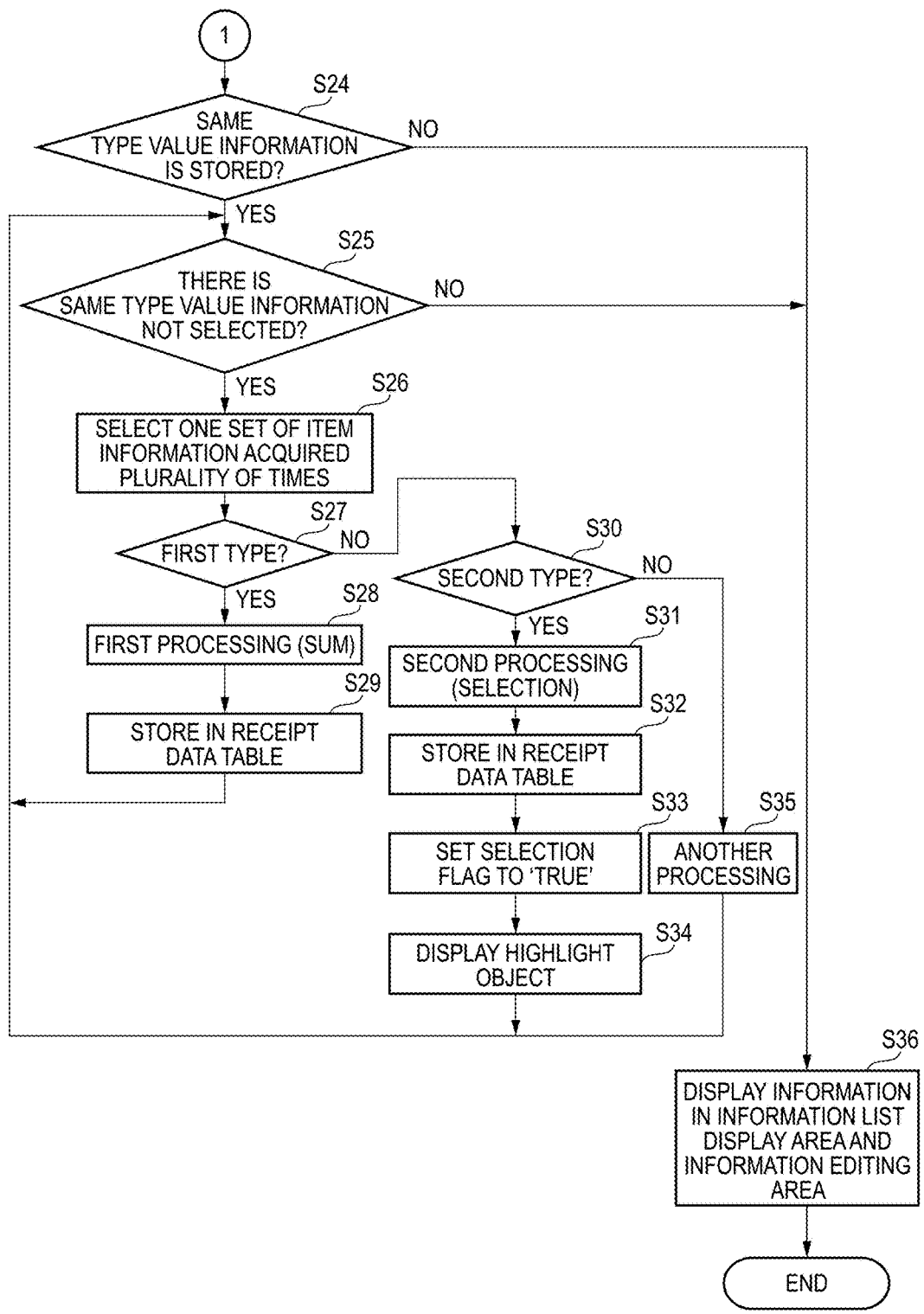
FIG. 8 is a continuation of the flowchart in FIG. 7.

As shown in FIG. 7, the CPU 121 determines whether the image data of the receipt image having the captured receipt is acquired (S11). In a case where the image data is not acquired (S11: NO), the CPU 121 repeats the processing of S11. In the specific example, the user arranges the receipt 31 (see FIG. 2) on the scanner apparatus 13 and inputs an instruction for performing a reading operation of capturing the receipt 31 to the PC 12. The CPU 121 transmits the instruction to perform a reading operation to the scanner apparatus 13. The scanner apparatus 13 captures the receipt 31, generates the image data D1 of the receipt image 33 (see FIG. 3) and transmits the same to the PC 12. In a case where the image data D1 transmitted from the scanner apparatus 13 is acquired (S11: YES), the CPU 121 acquires the character string information, which is the information of the character string, and the position information corresponding to the extracted character string information from the acquired image data D1 by the Optical Character Recognition (OCR) (S12). As the OCR, the well-known library including a feature extraction step such as the well-known edge detection technology and a matching step of comparing the extracted feature and a character template can be used.

Figure 9:
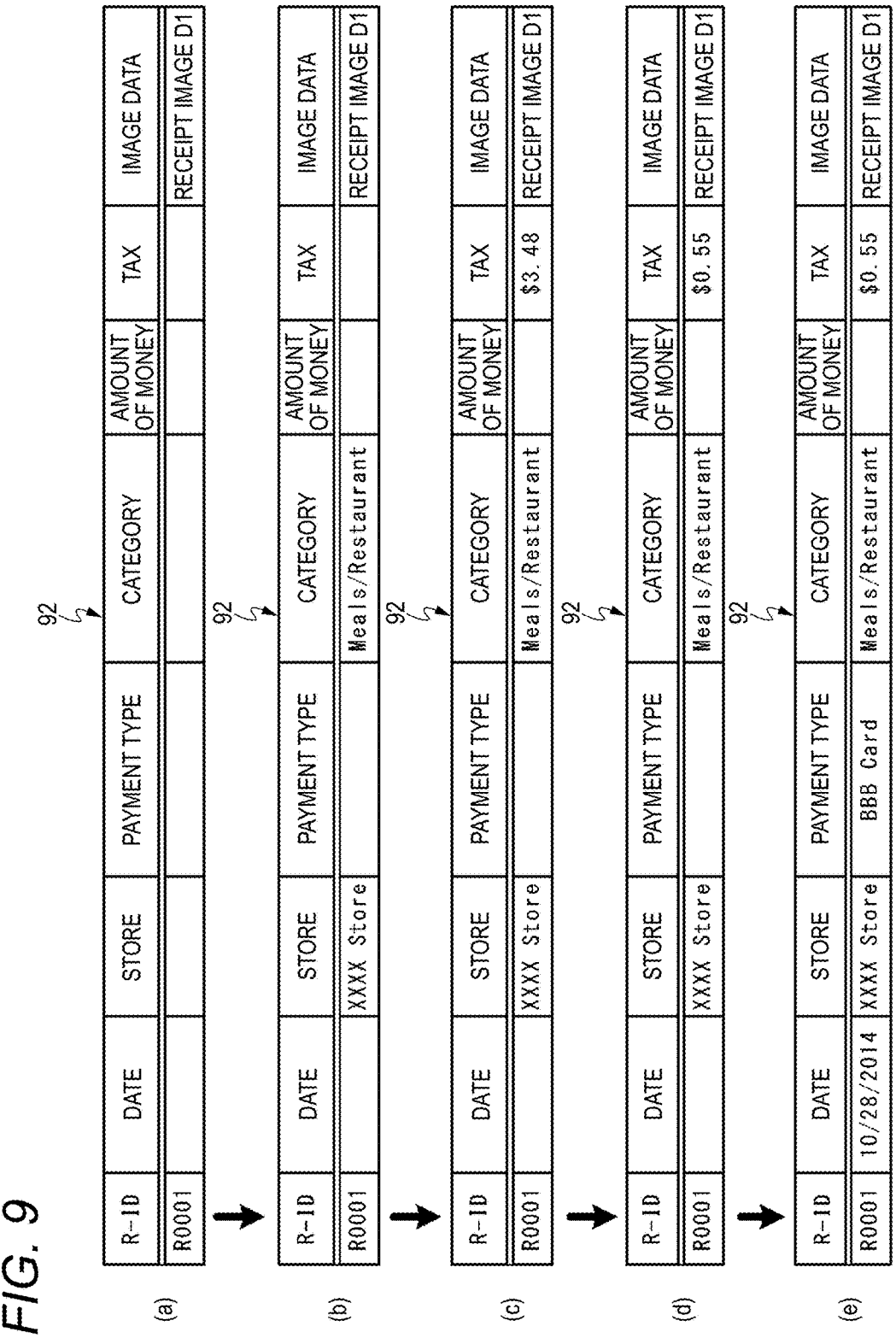
FIG. 9 is a state transition diagram of the receipt data table 92.

The CPU 121 prepares a data area for one case and stores the image data D1 of the receipt image 33 in the receipt data table 92 (S13). As shown in (a) of FIG. 9, the CPU 121 prepares a data area corresponding to the R-ID 'R0001', and stores the image data D1.

As shown in FIG. 13, the CPU 121 displays the receipt image 33 based on the image data D1 in the receipt image display area 52 of the management image 51 (S14). The CPU 121 selects one keyword corresponding to the item information of the keyword data table 91 (see FIG. 4) (S15). It is assumed that the CPU 121 selects, in S15, the keyword 'Store' corresponding to the item information 'store'. In the meantime, the processing of S15 is repeatedly executed (S23: NO, which will be described later). However, each time the CPU 121 executes the processing of S15, the CPU 121 sequentially selects keywords different from the keyword already selected.

The CPU 121 executes processing of S16 to S23, acquires value information, which corresponds to the keyword selected in S15, from a character string based on the character string information acquired in S12, and associates and stores the value information, the item information and the position information in the association data table 93. In the following, the processing of S16 to S23 is described.

The CPU 121 starts to search a character string coinciding with the keyword selected in S15 with respect to the character strings based on the character string information acquired in S12 (S16). That is, the CPU 121 starts an operation of specifying a keyword, which corresponds to the item information stored in the keyword data table 91, from the character strings based on the character string information acquired in S12. Hereinafter, the character string coinciding with the keyword selected in S15 is searched until it is determined in S18 that all of the character strings are searched (S18: YES).

The CPU 121 determines whether there is a character string coinciding with the keyword (S17). In a case where there is no character string coinciding with the keyword (S17: NO), the CPU 121 determines whether all of the character strings based on the character string information acquired in S12 are searched (S18). In a case where there is a character string, which has not been searched, in the character strings based on the character string information acquired in S12 (S18: NO), the CPU 121 returns to the processing of S17.

In the specific example, 'Store' of 'XXXX Store' is included in the character strings based on the character string information that the CPU 121 has acquired in S12. For this reason, in a case where the character string that the CPU 121 is searching reaches 'Store' of 'XXXX Store', the CPU 121 determines that there is a character string coinciding with the keyword selected in S15 (S17: YES).

The CPU 121 acquires the value information corresponding to the keyword (S19). In the meantime, the value information corresponding to the keyword is different as regards to the keywords. For example, the value information corresponding to the keywords 'Store', 'Super' and 'Road' is the character string information of the store name coinciding with or including each of 'Store', 'Super' and 'Road'. Also, the value information corresponding to the keywords 'Tax1' and 'Tax2' is the character string information of the numerical values, which are described in the same lines as the respective character strings of 'Tax1' and 'Tax2' and include '$' indicating the amount of money. Also, the keyword '//****' is the character string information of the date such as '20/12/2014', for example. The value information corresponding to the keyword 'Total' is the character string information of the numerical value, which is described in the same line as the character string of 'Total' and includes a predetermined character string (for example, '$', '¥' and the like) indicating the amount of money. In the meantime, even the character string information of the numerical value, which does not include the predetermined character string indicating the amount of money, can also be used as the value information inasmuch as it is described in the same line as the character string including the predetermined keyword such as 'Tax1', 'Tax2' and 'Total'.

In the specific example, the value information of the value 'XXXX Store' corresponding to the keyword 'Store' selected in S15 is acquired (S19). The CPU 121 associates and stores the item information, the value information acquired in S19 and the position information in the association data table 93 (S20). Specifically, as shown in (a) of FIG. 11, the CPU 121 prepares a data area corresponding to the RP-ID 'RP0001'. The CPU 121 stores the R-ID 'R0001' associated with the image data D1 of the receipt data table 92 (see (a) of FIG. 9) in the 'R-ID' of the association data table 93. Thereby, the information associated with the R-ID 'R0001' of the receipt data table 92 and the information associated with 'R0001' of the association data table 93 are associated with each other.

Figure 11:
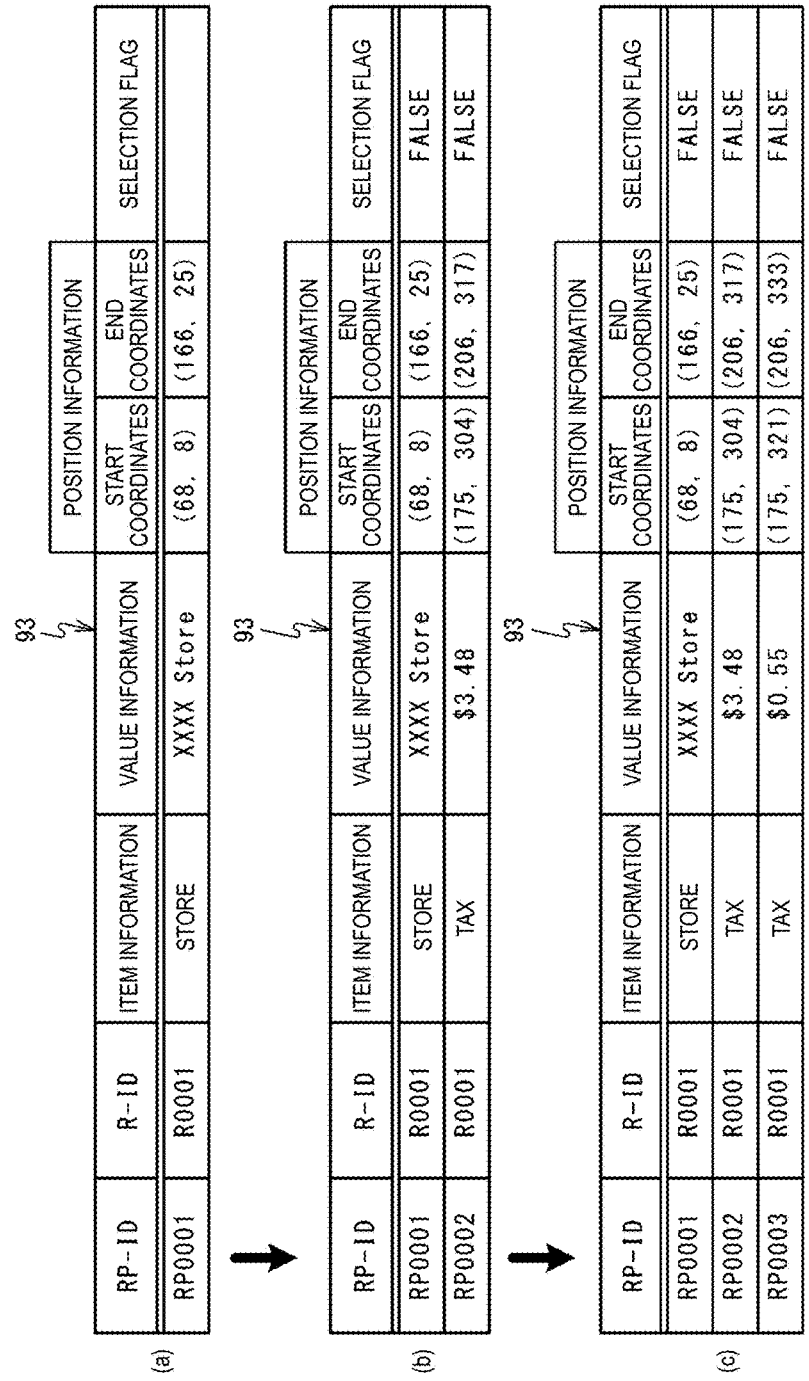
FIG. 11 is a state transition diagram of the association data table 93.

The CPU 121 stores the item information 'store', which is associated with the keyword 'Store' selected in S15 in the keyword data table 91 (see FIG. 4), in the 'item information' of the association data table 93 (see (a) of FIG. 11). The CPU 121 stores the value information 'XXXX Store' acquired in S19 in the association data table 93. The CPU 121 stores the position information, which corresponds to the value information acquired in S19, of the position information acquired in S12 in the 'position information' of the association data table 93. In the illustrative embodiment, it is assumed that the start coordinates are (68, 8) and the end coordinates are (166, 25). The CPU 121 stores 'FALSE' in the selection flag (see (a) of FIG. 11).

The CPU 121 stores the value information acquired in S19 in a corresponding field of the receipt data table 92 (S21). In the specific example, the value information 'XXXX Store' acquired in S19 is the value information corresponding to the item information 'store', as shown in the keyword data table 91 (FIG. 4). For this reason, the CPU 121 stores 'XXXX Store' in the field of 'store', as shown in (b) of FIG. 9. In the meantime, although not shown in FIG. 7, in a case where the value information is stored in the field of the store, the CPU 121 stores the value information of the category relating to the store in the field of the category. For example, in the HDD 124, 'XXXX Store' and the value information 'Meals/Restaurant' of the category are associated and stored in advance. The CPU 121 specifies the value information 'Meals/Restaurant' of the category corresponding to 'XXXX Store', and stores the same in the receipt data table 92 (see (b) of FIG. 9).

The CPU 121 displays a predetermined object at a position in the receipt image 33, which corresponds to the position information stored in the association data table 93 in S21 (S22). In this illustrative embodiment, it is assumed that the object displayed in S22 is a marker. By executing the processing of S22, a marker 951 is displayed so as to overlap 'XXXX Store' of the receipt image 33, as shown in FIG. 16. It is assumed that the marker 951 is blue.

The CPU 121 returns to the processing of S17. As shown in FIG. 13, the receipt image 33 does not include the character string of 'Store', except for 'XXXX Store'. For this reason, in a case where all the character strings based on the character string information acquired in S12 are completely searched, the CPU 121 determines that all the character strings are searched, as shown in FIG. 7 (S18: YES). The CPU 121 determines whether all the keywords of the keyword data table 91 (see FIG. 4) are searched (S23). In a case where there is a keyword (S23: NO) which has not been searched, the CPU 121 returns to the processing of S15 and selects one next keyword. In the specific example, the keyword 'Super' is selected (S15) and the search is started (S16). Since the receipt image 33 (see FIG. 13) does not include the character string of 'Super', the processing of S19 to S22 is not executed, and the CPU 121 returns to the processing of S15 (S23: NO).

It is assumed that the keyword 'Tax1' (see FIG. 4) corresponding to the item information 'tax' is selected in S15. In this case, in a case where the character string that the CPU 121 is searching reaches 'Tax1' of 'Tax1 9.250% $3.48' (see FIG. 13), the CPU 121 determines that there is a character string coinciding with the keyword selected in S15 (S17: YES). The CPU 121 acquires, as the value information, '$3.48' (see FIG. 13) which is described in the same line as the character string of 'Tax1' and indicates the amount of money (S19). As shown in (b) of FIG. 11, the CPU 121 associates and stores the item information 'tax', the value information '$3.48', the start coordinates '(175, 304)' and the end coordinates '(206, 317)' in the association data table 93 (S20). As shown in (c) of FIG. 9, the CPU 121 stores '$3.48' in the field of 'tax' (S21). As shown in FIG. 13, the CPU 121 displays a yellow marker 952 so as to overlap '$3.48' which is a tax amount of 'Tax1' (S22). The CPU 121 determines that there is a keyword in the keyword data table 91 (see FIG. 4) (S23: NO) which has not been searched, and returns to the processing of S15.

It is assumed that the keyword 'Tax2' (see FIG. 4) corresponding to the item information 'tax' is selected in S15. In this case, in a case where the character string that the CPU 121 is searching reaches 'Tax2' of 'Tax2 7.250% $0.55' (see FIG. 13), the CPU 121 determines that there is a character string coinciding with the keyword selected in S15 (S17: YES). As shown in (c) of FIG. 11, the CPU 121 associates and stores the item information 'tax', the value information '$0.55', the start coordinates '(175, 304)' and the end coordinates '(206, 317)' in the association data table 93 (S20). As shown in (d) of FIG. 9, the CPU 121 stores '$0.55' in the field of 'tax' (S21). That is, '$0.55' is overwritten with respect to '$3.48' (see (c) of FIG. 9). As shown in FIG. 13, the CPU 121 displays a yellow marker 953, which is the same color as the marker 952, so as to overlap '$0.55' which is a tax amount of Tax2' (S22).

It is assumed that the keyword '//**' (see FIG. 4) corresponding to the item information 'date' is selected in S15. As shown in FIG. 13, '10/28/2014', which is a date, is described at two places of upper and lower parts of the receipt image 33. In a case where the character string that the CPU 121 is searching reaches the date '10/28/2014' described at the upper part of the receipt image 33, the CPU 121 determines that there is a character string coinciding with the keyword selected in S15 (S17: YES). As shown with the RP-ID 'RP0004' in (d) of FIG. 12, the CPU 121 associates and stores the item information 'date', the value information '10/28/2014', the start coordinates '(6, 90)' and the end coordinates (119, 103)' in the association data table 93 (S20). As shown in (e) of FIG. 9, the CPU 121 stores '10/28/2014' in the field of 'date' (S21). As shown in FIG. 13, the CPU 121 displays a green marker 954 so as to overlap '10/28/2014' (S22**).

Also, in a case where the character string that the CPU 121 is searching reaches the date '10/28/2014' described at the lower part of the receipt image 33, the CPU 121 determines that there is a character string coinciding with the keyword selected in S15 (S17: YES). As shown with RP-ID 'RP0005' in (d) of FIG. 12, the CPU 121 associates and stores the item information 'date', the value information '10/28/2014', the start coordinates '(101, 518)' and the end coordinates '(227, 532)' in the association data table 93 (S20). As shown in (e) of FIG. 9, the CPU 121 stores '10/28/2014' in the field of 'date' (S21). That is, the CPU 121 overwrites '10/28/2014' in the field of 'date' in which '10/28/2014' has been stored. The CPU 121 displays a green marker 955 so as to overlap '10/28/2014' described at the lower part of the receipt image 33 (S22). That is, the markers 954, 955 of the same color are displayed with being overlapped with '10/28/2014' described at the upper and lower parts of the receipt image 33.

It is assumed that the keyword 'BBB Card' (see FIG. 4) corresponding to the item information 'payment type' is selected in S15. In a case where the character string that the CPU 121 is searching reaches the payment type 'BBB Card' of the receipt image 33, the CPU 121 determines that there is a character string coinciding with the keyword selected in S15 (S17: YES). As shown with the RP-ID 'RP0006' in (d) of FIG. 12, the CPU 121 associates and stores the item information 'payment type', the value information 'BBB Card', the start coordinates '(6, 366)' and the end coordinates '(33, 378)' in the association data table 93 (S20). As shown in (e) of FIG. 9, the CPU 121 stores 'BBB Card' in the field of 'payment type' (S21). As shown in FIG. 13, the CPU 121 displays a purple marker 956 so as to overlap 'BBB Card' of the receipt image 33 (S22).

It is assumed that the keyword 'Total' (see FIG. 4) corresponding to the item information 'amount of money' is selected in S15. In a case where the character string that the CPU 121 is searching reaches the amount of money 'Total' of the receipt image 33, the CPU 121 determines that there is a character string coinciding with the keyword selected in S15 (S17: YES). As shown with the RP-ID 'RP0007' in (d) of FIG. 12, the CPU 121 associates and stores the item information 'amount of money', the value information '$49.25', the start coordinates (169, 355)' and the end coordinates (206, 348)' in the association data table 93 (S20). As shown in (f) of FIG. 10, the CPU 121 stores '$49.25' in the field of 'amount of money' (S21). As shown in FIG. 13, the CPU 121 displays a red marker 957 so as to overlap '$49.25' of the receipt image 33 (S22).

In a case where all the keywords are searched (S23: YES), the CPU 121 determines whether same type value information, which is a plurality of value information associated with the same type of the item information, is stored by referring to the association data table 93 (see (d) of FIG. 12) stored in the HDD 124, as shown in FIG. 8 (S24). In a case where the same type value information is not stored (S24: NO), the CPU 121 executes processing of S36 which will be described later.

In the association data table 93 shown in (d) of FIG. 12, two information '$3.48' and '$0.55' is stored with respect to the value information (i.e., the same type value information) relating to the same type of the item information 'tax'. Also, '10/28/2014' associated with RP0004 and '10/28/2014' associated with RP0005 are stored with respect to the value information (i.e., the same type value information) relating to the same type of the item information 'date'. For this reason, the CPU 121 determines that the same type value information is stored (S24: YES), and executes processing of S25 to S35. The CPU 121 selects processing to be executed from at least one of first processing and second processing in S27 and S30 described later, in accordance with the type of the item information relating to the same type value information. The first processing is processing that is to be executed in S28 described later. The second processing is processing that is to be executed in S31 described later. In the following, the processing of S25 to S35 is described in detail.

The CPU 121 determines whether there is a same type of the item information which has not been selected in S26 described later (S25). In a case where there is a same type of the item information having not been selected (S25: YES), the CPU 121 selects one set of the item information acquired a plurality of times in the association data table 93 (see (d) of FIG. 12) (S26). In the specific example, it is assumed that the CPU 121 selects one set of the item information 'tax'.

The CPU 121 determines whether the item information selected in S26 is the first type by referring to the keyword data table 91 (see FIG. 4) (S27). Since the item information 'tax' is the first type, the CPU 121 determines that the item information is the first type (S27: YES) and executes the first processing (S28). That is, in S27, the CPU 121 selects the first processing as the processing to be executed, in accordance with the type of the item information relating to the same type value information.

The CPU 121 executes the first processing (S28). The first processing is processing of summing a plurality of values based on the same type value information, for example. The CPU 121 stores a result of the first processing in S28 (S29). In the specific example, the values '$3.48' and '$0.55' based on the same type value information are summed, so that '$4.03' is calculated (S28). As shown in (g) of FIG. 10, the calculated '$4.03' is stored in the field of 'tax' of the receipt data table 92 (S29). Then, the CPU 121 returns to the processing of S25.

In the specific example, since the same type of the item information 'date' has not been selected in S26, the CPU 121 determines that there is the same type of the item information having not been selected in S26 (S25: YES). The CPU 121 selects one set of the item information 'date' (S26). Since the item information 'date' is the second type (see FIG. 4), the CPU 121 determines that the item information is not the first type (S27: NO). The CPU 121 determines whether the item information selected in S26 is the second type by referring to the keyword data table 91 (see FIG. 4) (S30). Since the item information 'date' is the second type, the CPU 121 determines that the item information is the second type (S30: YES), and executes the second processing (S31). That is, in S30, the CPU 121 selects the second processing as the processing to be executed, in accordance with the type of the item information relating to the same type value information.

The CPU 121 executes the second processing (S31). The second processing is processing of selecting one of the plurality of values based on the same type value information, for example. In this illustrative embodiment, for example, the CPU 121 selects one of the plurality of values based on the same type value information by using the position information. Specifically, the CPU 121 calculates a length of the receipt image 33 (see FIG. 13) in the Y direction based on the image data D1. In this illustrative embodiment, it is assumed that the left and upper end of the receipt image 33 has coordinates (X1, Y1)=(0, 0) and the left and lower end thereof has coordinates (X2, Y2)=(0, 500). The CPU 121 calculates central coordinates M of the receipt image 33 in the Y direction. In this case, M is '(Y2−Y1)/2=250'. The CPU 121 selects a value of which a Y coordinate in the position information is smaller than M '250' from the plurality of values based on the same type value information. That is, the CPU 121 selects a value based on the same type value information, which is located above the center of the receipt image 33 in the Y direction. As shown in (d) of FIG. 12, the same type value information of which the Y coordinate is smaller than '250' of the two same type value information '10/28/2014', which is the item information 'date', is '10/28/2014' of which the position information has the start coordinates (6, 90) and the end coordinates (119, 103). For this reason, the CPU 121 selects the value ('10/28/2014' of which the start coordinates are (6, 90) and the end coordinates are (119, 103)) based on the same type value information (S31).

Figure 10:
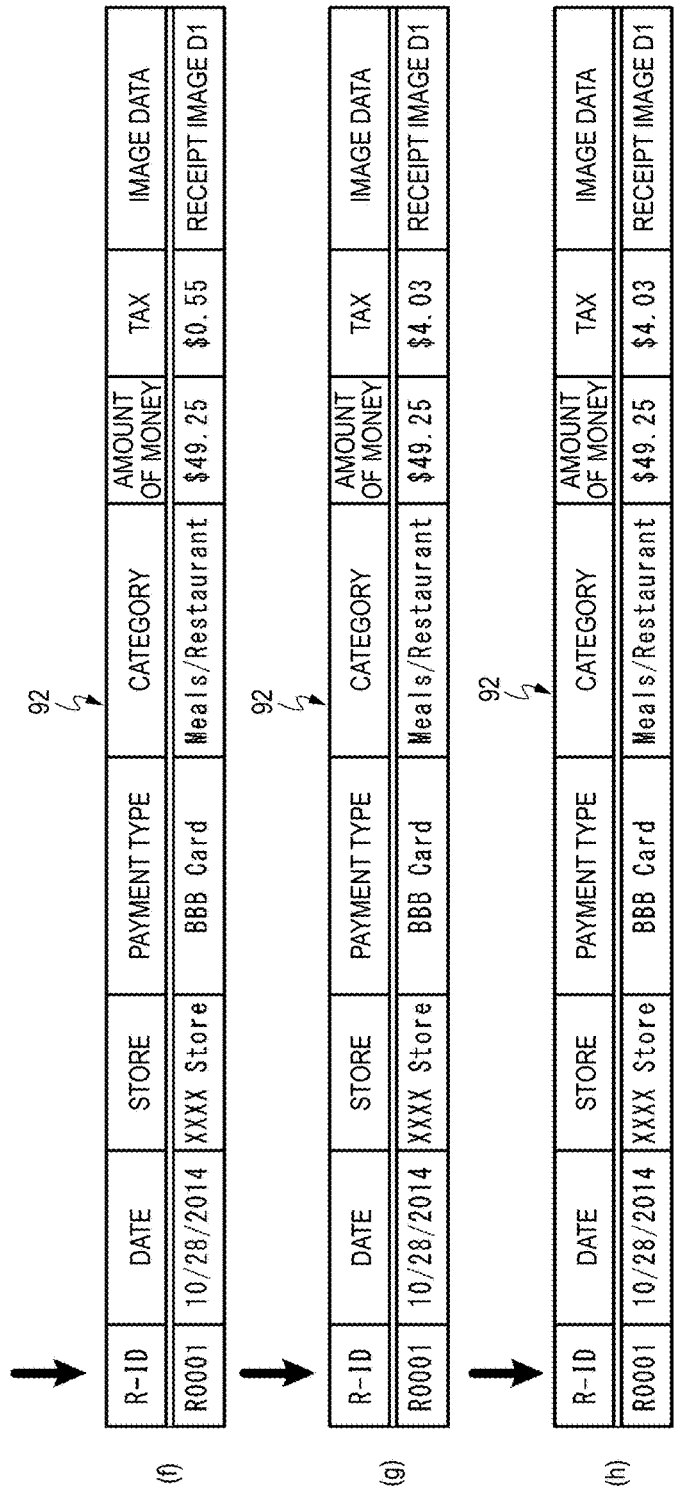
FIG. 10 is a continuation of the state transition diagram in FIG. 9.

The CPU 121 stores the value '10/28/2014' based on the same type value information selected in S31 in the receipt data table 92 (see (g) of FIG. 10) (S32). Thereby, the field of the item information 'date' is overwritten with the value '10/28/2014' based on the same type value information.

The CPU 121 sets the selection flag, which is associated with the value based on the same type value information selected in S31 in the association data table 93, to 'TRUE' (S33). That is, the CPU 121 associates and store the value information about the selected value and the information, which indicates the selection, in the association data table 93 by setting the selection flag to 'TRUE'. When the processing of S33 is executed, the selection flag of the value '10/28/2014' based on the same type value information selected in S31 is set to 'TRUE', as shown in (e) of FIG. 12.

The CPU 121 displays a highlight object 97 for the value selected in D31 of the plurality of values based on the same type value information (S34). Specifically, the CPU 121 refers to the association data table 93, and displays the highlight object 97 (see FIG. 13) at the position of the receipt image 33 indicated by the position information relating to the value information of which the selection flag is set to 'TRUE'. As shown in FIG. 13, in this illustrative embodiment, a thick line of a rectangular outward appearance is displayed in a range from the start coordinates (6, 90) to the end coordinates (119, 103) of the receipt image 33. Thereby, the highlight object 97 is displayed around the marker 954 of the date '10/28/2014' described at the upper part of the receipt image 33. The CPU 121 returns to the processing of S25.

In a case where it is determined in S30 that the item information selected in S26 is not the second type (S30: NO), the CPU 121 executes processing different from the first processing and the second processing, in accordance with the type of the item information (S35). The processing that is to be executed in S35 is processing of subtracting one of the two values based on the same type value information from the other, for example. Although not shown, the CPU 121 stores a result of the processing of S35. The CPU 121 returns to the processing of S25.

In a case where all the same type of the item information is selected in S26, the CPU 121 determines that there is no same type of the item information which has not been selected in S26 (S25:NO). The CPU 121 displays the information in the information list display area 53 and the information editing area 54 of the management image 51 (see FIG. 13), based on the receipt data table 92 (see (g) of FIG. 10) (S36). The CPU 121 displays in the information list display area 53 the information of 'date', 'store', 'payment type', 'category', 'amount of money' and 'tax' stored in the receipt data table 92, as a list. Specifically, as shown in FIG. 13, the CPU 121 displays 'Date', 'Vender', 'Payment type', 'Category', 'Amount' and 'Sales Tax', which are words corresponding to 'date', 'store', 'payment type', 'category', 'amount of money', and 'tax' of the receipt data table 92. The CPU 121 displays the information stored in the receipt data table 92 (see (g) of FIG. 10) below 'Date', 'Vender', 'Payment type', 'Category', 'Amount' and 'Sales Tax'.

Also, the CPU 121 displays 'Date', 'Vender', 'Payment type', 'Category', 'Amount', 'Sales Tax' in the information editing area 54. Also, the same green background as the markers 954, 955 is displayed for 'Date'. The same blue background as the marker 951 is displayed for 'Vender'. The same purple background as the marker 956 is displayed for 'Payment type'. The same red background as the marker 957 is displayed for 'Amount'. The same yellow background as the markers 952, 953 is displayed for 'Sales Tax'. As described above, since the color of the word and the color of the marker are associated with each other, the user can easily check that the information displayed in the information editing area 54 is the information displayed on the basis of which character string of the receipt image 33, by checking the color.

The CPU 121 displays an edition frame 59 at the right of each word. In the edition frame 59, the information stored in the receipt data table 92 (see (g) of FIG. 10) is displayed. Although not shown, the CPU 121 can rewrite the information described in the edition frame 59 in accordance with the user's operation on the PC 12. The information rewritten by the user is reflected in the receipt data table 92 (see (g) of FIG. 10) and the information list display area 53. For example, in a case where the user rewrites '10/28/2014' in the edition frame 59 of the information editing area 54 to '9/28/2014', '10/28/2014' in the receipt data table 92 (see (g) of FIG. 10) and the information list display area 53 is changed to '9/28/2014'. In this way, since the operation of rewriting the information is performed, even in a case where, for example, the date '10/28/2014' is falsely recognized as '6/28/2014', the user can correct the date to '10/28/2014'. Also, since the receipt image 33 and the information editing area 54 are displayed in the management image 51, the user can rewrite the information in the edition frame 59 of the information editing area 54 while checking the receipt image 33. After executing the processing of S36, the CPU 121 ends the main processing.

The change processing is described with reference to FIG. 14. The change processing is processing of selecting another value on the basis of the user's operation in replacement of the plurality of values based on the same type value information selected in the second processing (S31 in FIG. 8). Since the change processing is executed, for example, even in a case where a value, which is different from the value that the user wants, is selected in S31, the user can re-select the value.

Figure 14:
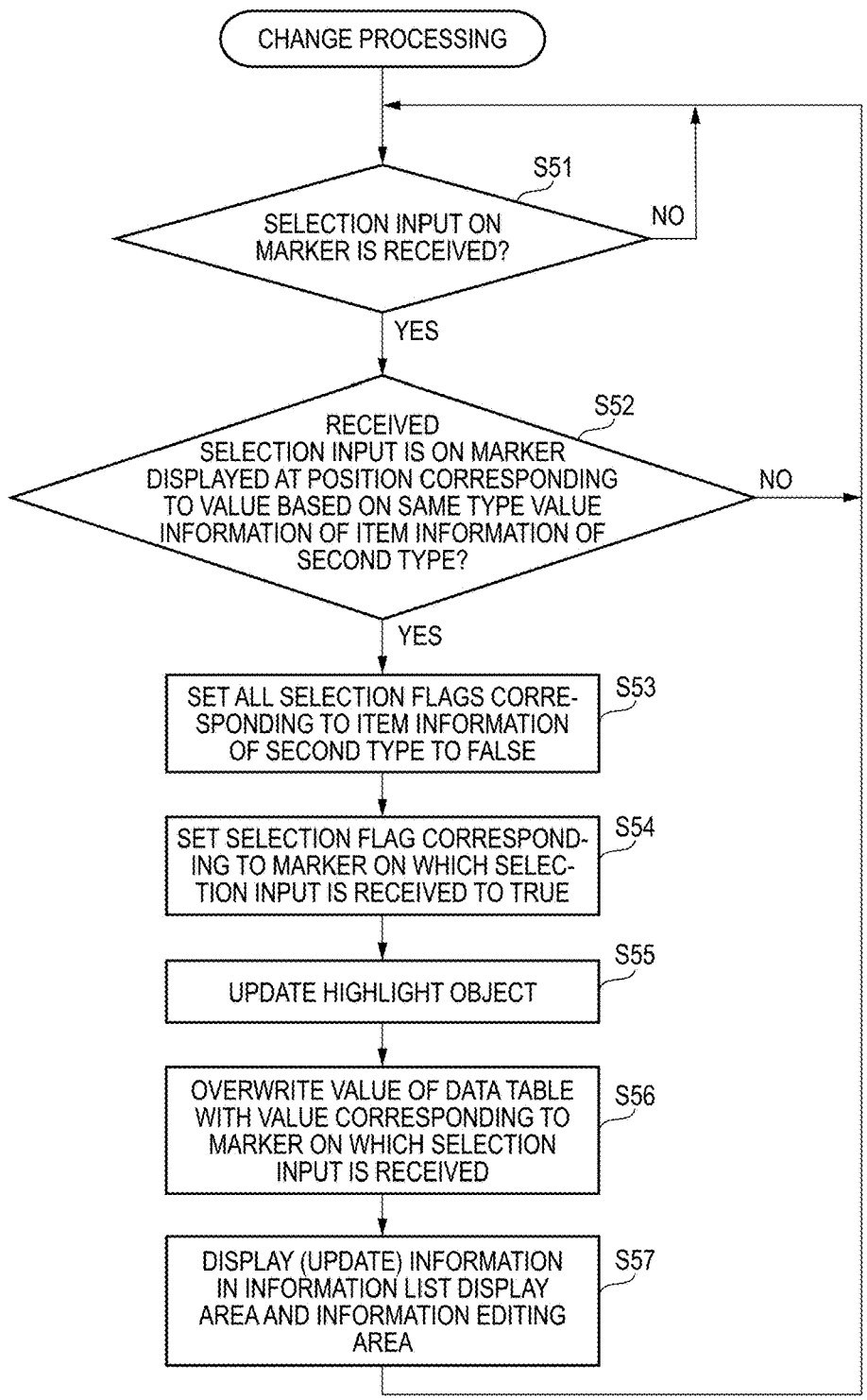
FIG. 14 is a flowchart of change processing.

As shown in FIG. 14, the CPU 121 determines whether a selection on any one of the markers 951 to 957 is received (S51). In a case where the selection input is not received (S51: NO), the CPU 121 repeats the processing of S51 and receives a selection input. In a case where the selection input is received (S51: YES), the CPU 121 determines whether the selection input is a selection input on the marker displayed at the position corresponding to the value based on the same type value information of the second type of the item information (S52). In a case where the selection input is not a selection input on the marker displayed at the position corresponding to the value based on the same type value information of the second type of the item information (S52: NO), the CPU 121 returns to the processing of S51.

For example, it is assumed that the user inputs a selection input of selecting the marker 955 (see FIG. 13) of the receipt image 33 by operating a pointing device (not shown) of the PC 12. The CPU 121 determines that the selection input on the marker 955 is received (S51: YES). The selected marker 955 is a marker displayed at the position corresponding to the value '10/28/2014' based on the same type value information of the second type of the item information 'date'. For this reason, the CPU 121 determines that the selection input on the marker displayed at the position corresponding to the value based on the same type value information of the second type of the item information is received (S52: YES).

The CPU 121 associates the selection flag 'TRUE' with the value information corresponding to the marker on which the selection input is received in S51, and stores the same in the HDD 124 (see S53 and S54). By the processing of S53 and S54, the value information with which the selection flag 'TRUE' is associated is changed. Specifically, the CPU 121 sets all the selection flags corresponding to the second type of the item information 'date' selected in the association data table 93 (see (e) of FIG. 12) to 'FALSE' (S53). Thereby, as shown in (f) of FIG. 15, the selection flag associated with RP0004 is changed from 'TRUE' (see (e) of FIG. 12) to 'FALSE'.

The CPU 121 sets the selection flag of the value information, which corresponds to the marker 955 on which the selection input is received in S51, of the association data table 93 to 'TRUE' (S54). Thereby, as shown in (g) of FIG. 15, the selection flag associated with RP0005 is changed from 'FALSE' to 'TRUE'.

The CPU 121 updates the highlight object 97 (S55). Specifically, the CPU 121 displays the highlight object 97 at the position of the receipt image 33, which is indicated by the position information relating to the value information of which the selection flag is set to 'TRUE', by referring to the association data table 93 (see (g) of FIG. 15). Thereby, as shown in FIG. 16, the highlight object 97 is displayed around the marker 955 of the date '10/28/2014' indicated at the lower part of the receipt image 33. In the meantime, as the selection flag is changed from 'TRUE' to 'FALSE', the highlight object 97 (see FIG. 13) displayed around the marker 954 of the date '10/28/2014' indicated at the upper part of the receipt image 33 (see FIG. 16) is erased. In this way, in S55, the change result in S54 is displayed on the display 128.

The CPU 121 stores the value '10/28/2014' based on the value information, which corresponds to the marker on which the selection input is received in S51, in the receipt data table 92 (see (g) of FIG. 10) (S56). Thereby, '10/28/2014' shown in (g) of FIG. 10 is overwritten with '10/28/2014' shown in (h) of FIG. 10.

Like S36, the CPU 121 displays the information in the information list display area 53 and the information editing area 54 of the management image 51 (see FIG. 13) on the basis of the receipt data table 92 (see (h) of FIG. 10) (S57). That is, the information list display area 53 and the information editing area 54 are updated. For this reason, if the value based on the value information, which corresponds to the marker on which the selection input is received in S51, is '8/28/2014', the value is changed from '10/28/2014' to '8/28/2014' in S56. Then, in S57, the field corresponding to 'Date' in the information list display area 53 and the information editing area 54 is changed to '8/28/2014'. The CPU 121 returns to the processing of S51 after the execution of S57.

The processing of the illustrative embodiment is executed in the above-described manner. In this illustrative embodiment, the character string information and the position information are acquired from the image data D1 of the receipt image 33 capturing the receipt 31 by the OCR (S12). The value information corresponding to the keyword is acquired from the character string based on the character string information acquired in S12, and the position information, the item information and the value information are associated and stored in the association data table 93 (S16, S19, and S20). The markers 951 to 957 (see FIG. 13) are displayed at the positions corresponding to the position information of the receipt image 33 (S22). In a case where it is determined that the same type value information is stored (S24: YES), the processing to be executed is selected from at least one of the first processing and the second processing in accordance with the type of the item information related to the same type value information (S27 and S30). Then, the selected processing is executed (S28 and S31). In this way, the markers 951 to 957 are displayed at the positions of the value information corresponding to the keywords of the receipt image 33 (see FIG. 13). For this reason, as compared to a case where the markers 951 to 957 are not displayed, the user can easily check which value is specified by the CPU 121 as the value corresponding to the keyword. Further, the values of the same type of the item information acquired from the plurality of positions of the receipt 31 are processed in accordance with the type of the item information (S28 and S31). Therefore, as compared to a configuration where the values of the same type of the item information acquired from the plurality of positions of the receipt 31 are not processed in accordance with the type of the item information, a possibility that a user's desired result will be obtained increases. Therefore, the user's convenience is improved.

Further, in a case where the item information related to the same type value information is the first type, the first processing of summing the plurality of values based on the same type value information is selected (S27: YES). Then, the plurality of values based on the same type value information is summed (S28). For this reason, the plurality of values related to the item information of the first type is automatically summed. Therefore, as compared to a case where the plurality of values is not summed, a possibility that a user's desired result will be obtained in a case where the item information of the first type is described at the plurality of positions of the receipt 31 increases. Also, since it is not necessary for the user to manually sum the values, the user's convenience is improved.

Also, in a case where the item information relating to the same type value information is the second type, the second processing of selecting one of the plurality of values based on the same type value information is selected (S30: YES). Then, one of the plurality of values based on the same type value information is selected, and the information indicating the selection is associated with the selected value information and is stored in the association data table 93 (S33). In this illustrative embodiment, in S33, the selection flag is set to 'TRUE'. In this way, one of the plurality of values relating to the item information of the second type is automatically selected. For this reason, as compared to a case where one of the plurality of values is not selected, a possibility that a user's desired result will be obtained in a case where the item information of the second type is described at the plurality of positions of the receipt 31 (see FIG. 2) increases. Also, since it is not necessary for the user to manually select one value, the user's convenience is improved.

Also, one of the plurality of values based on the same type value information is selected by using the position information (S31). In this case, one of the plurality of values relating to the item information of the second type is automatically selected by using the position information. For this reason, as compared to a case where the position information is not referred to, a possibility that a user's desired result will be obtained increases.

Also, the highlight object 97 (see FIG. 13) is displayed for the value selected in S31 among the plurality of values based on the same type value information (S34). In the meantime, the object (in this illustrative embodiment, the marker 955 for which the highlight object 97 is not displayed) which is different from the highlight object 97 is displayed for a value not selected in S31 among the plurality of values based on the same type value information. For this reason, as compared to a case where the display of the object is not changed, the user can easily check the value selected in the receipt image 33, so that the user's convenience is improved.

Also, the CPU 121 determines that the selection input on the marker 955 is received (S51: YES) and determines that the selection input is the selection input on the marker displayed at the position corresponding to the value based on the same type value information of the item information of the second type (S52: YES). The value information with which the selection flag 'TRUE' is associated is changed to the value information corresponding to the marker on which the selection input is received in S51, which is then stored in the HDD 124 (see S53 and S54). In this case, the value selected in S31 can be changed to the user-selected value. Therefore, the user's convenience is improved.

Also, the results of the processing executed in S28 and S31 are displayed on the display 128 (S34 and S36). For this reason, the user can easily check the results of the processing executed in S28 and S31. Therefore, the user's convenience is improved.

Also, the change results changed by the execution of S53 and S54 are displayed on the display 128 (S55). For this reason, the user can easily check the change results by the processing of S53 and S54. Therefore, the user's convenience is improved.

Also, the image data is acquired (S11: YES), and the character string information and the position information are acquired from the acquired image data by the OCR (S12). Therefore, not only the image data stored in advance but also the image data newly acquired in S11 is used to acquire the character string information and the position information by the OCR, so that the processing can be executed. Therefore, the user's convenience is improved.

In the above illustrative embodiment, the processing of S12 shown in FIG. 7 is an example of the 'acquiring character string information and position information' of the present disclosure. The processing of S16, S19 and S20 is an example of the 'storing association data' of the present disclosure. The processing of S16 is an example of the 'specifying a keyword' of the present disclosure. The processing of S19 is an example of the 'acquiring value information' of the present disclosure. The processing of S20 is an example of the 'associating and storing item information, acquired value information and position information' of the present disclosure. The processing of S22 and S34 (see FIG. 8) is an example of the 'displaying a receipt image and a predetermined object' of the present disclosure. The processing of S24 shown in FIG. 8 is an example of the 'determining whether same type value information is stored' of the present disclosure. The processing of S27 and S30 is an example of the 'selecting processing to be executed' of the present disclosure. The processing of S28, S29, S31, S32 and S33 is an example of the 'executing selected processing' of the present disclosure. The processing of S51 shown in FIG. 14 is an example of the 'receiving a selection input' of the present disclosure. The processing of S52 is an example of the 'determining whether the received selection input is a selection input on the object' of the present disclosure. The processing of S53 and S54 is an example of the 'associating and storing selection information and value information' of the present disclosure. The processing of S36 shown in FIG. 8 is an example of the 'displaying a result of executing the selected processing' of the present disclosure. The processing of S55 is an example of the 'displaying a result of associating and storing' of the present disclosure. The HDD 124 is an example of the 'storage unit' of the present disclosure.

The PC 12 is an example of the 'image processing apparatus' of the present disclosure. The CPU 121 is an example of the 'hardware processor' of the present disclosure. The HDD is an example of the 'memory' of the present disclosure.

The present disclosure is not limited to the above illustrative embodiment, and a variety of changes can be made. For example, although the image data is acquired from the scanner apparatus 13 (S11), the present disclosure is not limited thereto. For example, the CPU 121 may execute the processing of S12 and thereafter by using the image data stored in advance. Also, although the change results of S53 and S54 are displayed on the display 128 (S55), the change results may not be displayed.

Also, although the CPU 121 can change the value selected in S31 to the user-selected value (S53 to S57), the CPU 121 may be configured not to be able to change the value. Also, although the thick line of the rectangular outward appearance is displayed as the highlight object 97, the present disclosure is not limited thereto. For example, as the highlight object 97, the marker may be blinked or the color of the marker may be thickened. Also, the highlight object 97 may not be displayed.

Also, in S31, the method of selecting one of the plurality of values based on the same type value information by using the position information is not limited. For example, the position information may be used and selected by another method, in accordance with the item information. For example, in a case where the item information is 'date', the uppermost value of the receipt image 33 may be selected from the plurality of values based on the same type value information, and in a case where the item information is 'payment type', a value within a predetermined range of a central part of the receipt image 33 in the upper and lower direction may be selected from the plurality of values based on the same type value information. Also, the position to be selected may be changed depending on the value information (i.e., the store name) of the item information 'store'. For example, when the value information of the item information 'store' is 'XXXX Store', the uppermost value of the receipt image 33 may be selected from the plurality of values based on the same type value information with respect to the item information 'date', and when the value information of the item information 'store' is 'Super YYYY', the lowest value of the receipt image 33 may be selected from the plurality of values based on the same type value information with respect to the item information 'date'. Also, in S31, one of the values based on the same type value information is selected by using the position information. However, the position information may not be referred to. For example, the CPU 121 may randomly select one of the plurality of values based on the same type value information.

Also, the object that is displayed in S22 and the like is not limited to the markers 951 to 957. For example, a star mark, a predetermined mark and the like may also be used. Also, for example, like a management image 511 of a modified embodiment shown in FIG. 17, instead of the markers 951 to 957 (see FIG. 13), character strings 961 to 967 in which the value information is texted may be displayed. The character strings 961 to 967 are displayed at the positions of the value information corresponding to the keywords of the receipt image 33, more specifically, at the positions adjacent to the values of the value information corresponding to the keywords. The character strings 961 to 967 are surrounded by rectangular frames. The highlight object 97 is indicated by the rectangular frame thicker than the other frame.

In this modified embodiment, the CPU 121 can arbitrarily rewrite the character strings 961 to 967 on the basis of the user's operation. The CPU 121 reflects the rewritten character strings 961 to 967 in the receipt data table 92, the information list display area 53, and the edition frame 59 of the information editing area 54. For example, in a case where the user rewrites the character string 961 'XXXX Store' to 'VVVV Store', 'XXXX Store' of the receipt data table 92 (see (g) of FIG. 10), the information list display area 53 and the edition frame 59 of the information editing area 54 is changed to 'VVVV Store'. Also, in a case where the user rewrites the character string 962 '$3.48' or the character string 963 '$0.55' corresponding to the item information 'tax', the same sum processing as S28 is executed, and '$4.03', which indicates the total sum of the tax, is changed to the newly summed value in the receipt data table 92 (see (g) of FIG. 10), the information list display area 53, and the edition frame 59 of the information editing area 54. In this way, since the character strings 961 to 967 can be rewritten, for example, even in a case where the OCR is executed in S12, so that the store name 'XXXX Store' is falsely recognized as 'XXXP Store', as shown in the character string 961 of FIG. 18, the user can correct the store name to 'XXXX Store' shown in FIG. 17.

Figure 17:
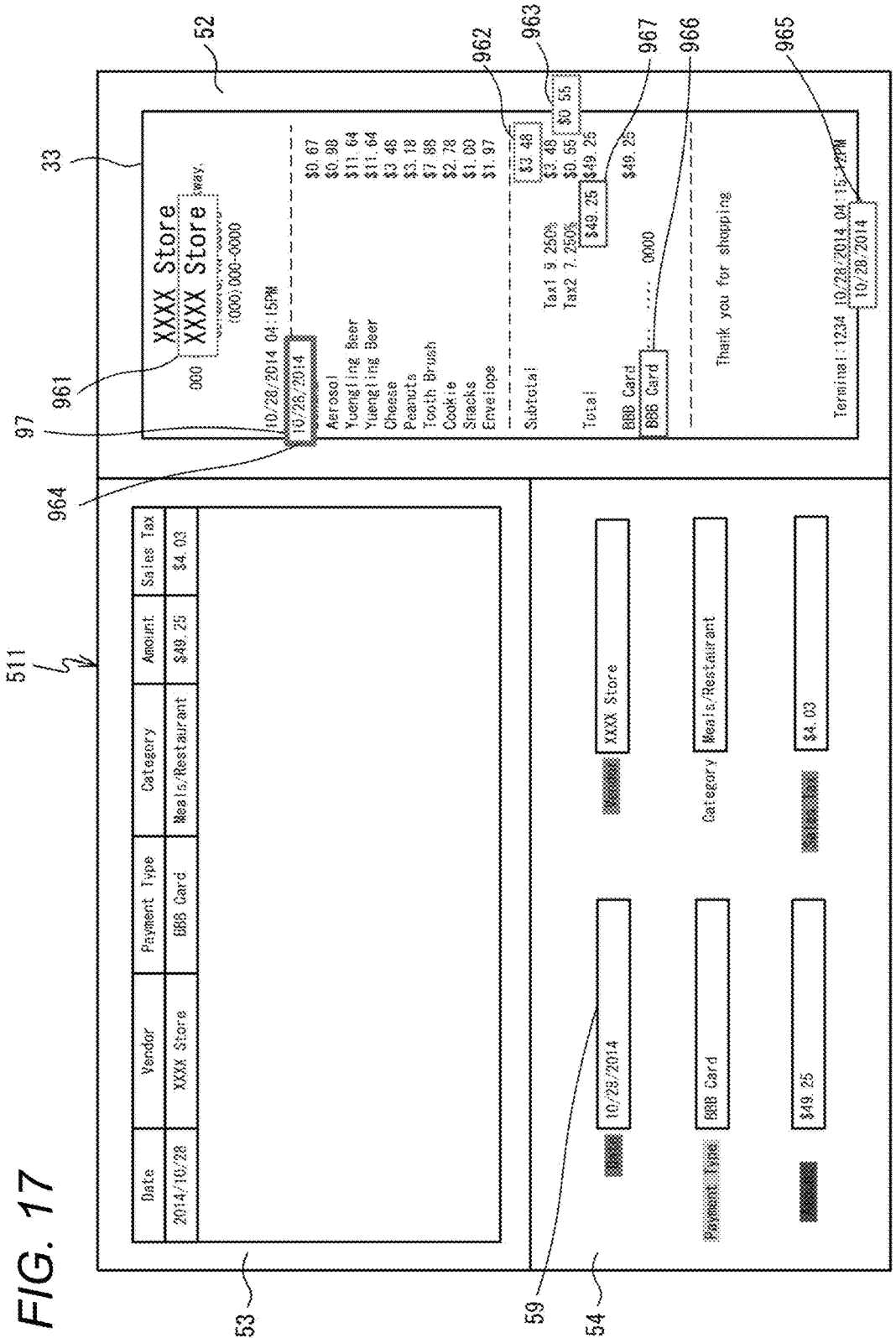
FIG. 17 illustrates a management image 511 in which character strings 961 to 967 are displayed.

Also, each of the character strings 961 to 967 may be moved to any position of the receipt image 33. For example, as shown in FIG. 17, in a case where the character string 967 '$49.25', which indicates the summed amount of money, is recognized as the summed amount of money '$11.64' due to the false recognition, the character string 967 is displayed at the position of the character string 967 shown in FIG. 18. In this case, as shown in FIG. 18, the character string 967 is displayed as '$11.64', '$11.64' is stored in the receipt data table 92, and '$11.64' is displayed in the field corresponding to 'Amount' of the information list display area 53 and the information editing area 54.

Figure 18:
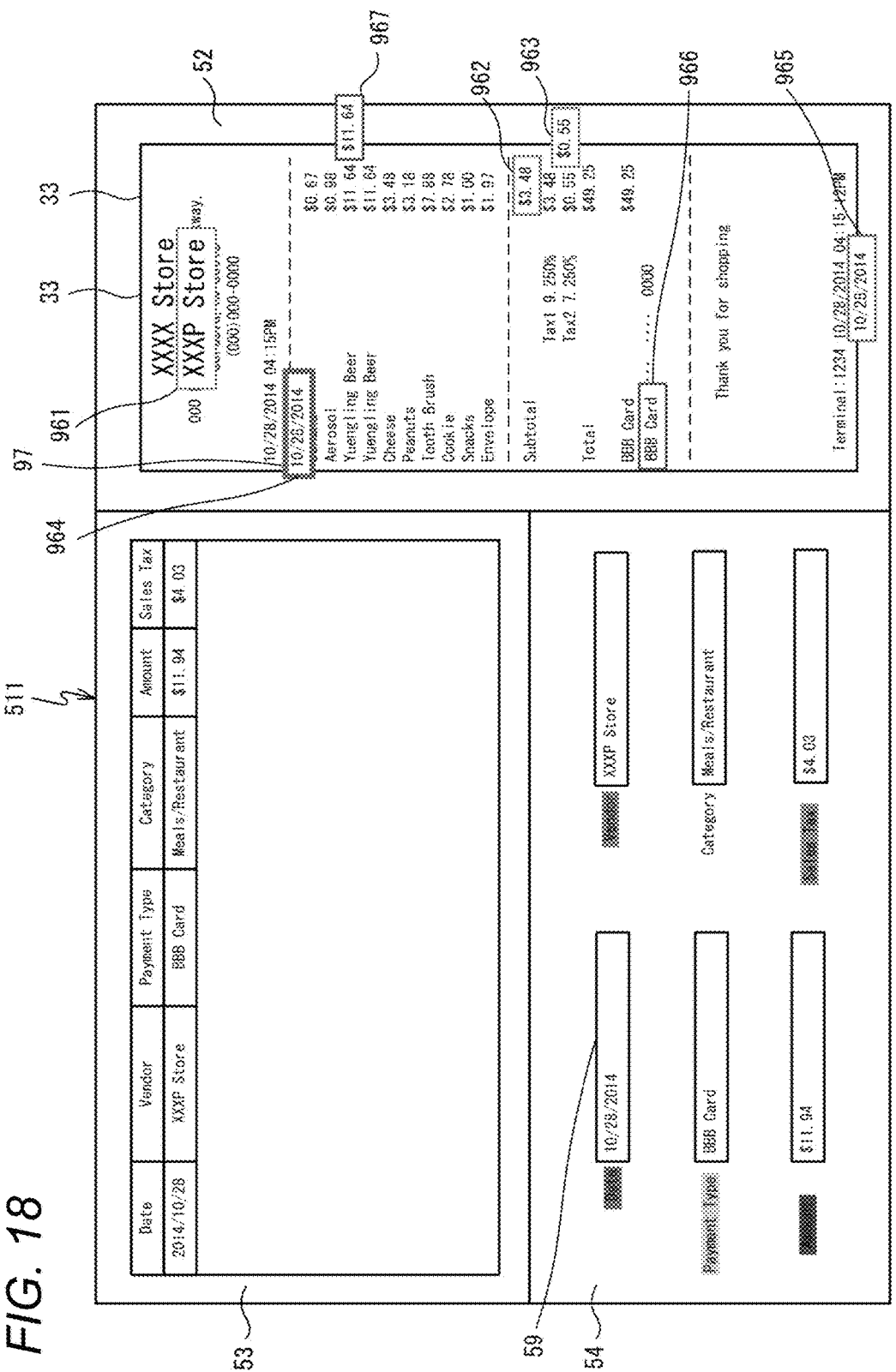
FIG. 18 illustrates the management image 511 including a falsely recognized character string.

In this case, the CPU 121 moves the character string 967 shown in FIG. 18 to the position of the character string 967 shown in FIG. 17, i.e., the position adjacent to '$49.25', based on the user's operation on the pointing device, for example. Further, the CPU 121 rewrites the character string 967 '$11.64' to '$49.25', based on the user's operation. In the meantime, in a case where the CPU 121 moves the character string 967 to the position adjacent to '$49.25', the CPU 121 may automatically rewrite the character string 967 '$11.64' to '$49.25' by using the position information.

The CPU 121 changes '$11.64' to '$49.25' in the receipt data table 92 (see (g) of FIG. 10), the information list display area 53 and the information editing area 54. Thereby, '$49.25' is stored in the receipt data table 92, as shown in FIG. 17, and '$49.25' is displayed in the field corresponding to 'Amount' of the information list display area 53 and the information editing area 54.

Also, the image processing apparatus of the present disclosure is not limited to the PC 12. For example, the image processing apparatus may be a portable terminal, a server and the like. Also, the portable terminal may capture the receipt 31 by a capturing device such as a camera embedded in the portable terminal to acquire the image data (S11: YES in FIG. 7), and execute the processing of S12 and thereafter. Also, the server may receive and acquire the image data transmitted from the other device through the network (S11: YES) and execute the processing of S12 and thereafter.

What is claimed is:

1. A non-transitory computer readable storage medium storing a program, when executed by a hardware processor, causing an image processing apparatus to perform:
receiving image data of a receipt image capturing a receipt; and
performing the following procedures automatically after receiving the image data of the receipt image:
acquiring, from the image data of the receipt image capturing the receipt, character string information which is information of a character string and position information which is information of a position of the character string in the receipt image by an Optical Character Recognition (OCR);
storing an association data table in a storage unit, the storing comprising:
acquiring value information which is information of a value corresponding to a keyword from the character string based on the acquired character string information by referring to a keyword data table, the keyword being a character string, the keyword data table storing, for each of a plurality of pieces of item information, the correspondence between the keyword, the item information, and a type of the item information, the plurality of pieces of item information corresponding to a plurality of pieces of displaying item information to be listed in a list in an information list display area of a management image, the keyword data table having been stored in the storage unit before the image data of the receipt image is received, and the acquiring of the value information being performed for each keyword stored in the keyword data table; and
storing, in the storage unit, the association data table in which, for each keyword stored in the keyword data table, the acquired value information corresponding to the keyword, position information corresponding to the acquired value information among the acquired position information, and the item information corresponding to the keyword are associated;
determining, for each of the plurality of pieces of item information stored in the association data table, whether one value information is associated with the item information or a plurality of pieces of value information are associated with the item information by referring to the association data table;
deciding, in a case where it is determined that one value information is associated with the item information, that the one value information is a displaying value information, and storing the displaying value information and the item information in association in a receipt data table;
obtaining, in a case where it is determined that a plurality of pieces of value information are associated with the item information, one value information by executing a processing corresponding to the item information by referring to the keyword data table, deciding that the one value information is a displaying value information, and storing the displaying value information and the item information in association in the receipt data table,
wherein, in a case where it is determined that the item information is a first type by referring to the keyword data table, a first processing is executed as the processing corresponding to the item information, and
wherein, in a case where it is determined that the item information is a second type by referring to the keyword data table, a second processing is executed as the processing corresponding to the item information, the second processing being different from the first processing; and
displaying, on a display unit capable of displaying an image, the management image by referring to the receipt data table and the association data table, the management image including the information list display area and a receipt image display area,
wherein the information list display area displays the list of the plurality of pieces of displaying item information and the displaying value information which are stored in association in the receipt data table, and
wherein the receipt image display area displays: the receipt image; and, for the plurality of pieces of item information stored in the association data table, a marker image at a position indicated by the position information which is stored in the association data table and is associated with the item information, the marker image indicating a status corresponding to the item information, and the marker image being different for each item information.

2. The storage medium according to claim 1,
wherein the first processing includes summing a plurality of values which are respectively identified by the plurality of pieces of value information associated with the item information and storing the summed value in the storage unit.

3. The storage medium according to claim 1,
wherein the second processing includes selecting one of a plurality of values which are respectively identified by the plurality of pieces of value information associated with the item information,
associating selection information indicating the selection with the value information relating to the selected value in the association data table, and storing the selection information in the storage unit.

4. The storage medium according to claim 3,
wherein the second processing includes selecting one of the plurality of values which are respectively identified by the plurality of pieces of value information associated with the item information by using the position information.

5. The storage medium according to claim 3,
wherein the displaying comprises displaying the marker image such that a first marker image is displayed for the value selected by the second processing and a second marker imaged different from the first marker image is displayed for a value not selected by the second processing, among the plurality of values which are respectively identified by the plurality of pieces of value information associated with the item information.

6. The storage medium according to claim 3,
wherein the program, when executed by the hardware processor, causes the image processing apparatus to further perform:
  receiving a selection input on one of the marker images displayed on the display unit,
  determining whether the received selection input is the selection input on the marker image displayed at a position corresponding to a value which is identified by one of the plurality of pieces of value information associated with the item information of the second type, and
  associating and storing, in the storage unit, in a case where the determining determines that the received selection input is the selection input on the marker imaged displayed at the position corresponding to the value which is identified by the one of the plurality of pieces of value information associated with the item information of the second type, the selection information and the value information corresponding to the marker imaged on which the selection input is received.

7. The storage medium according to claim 6,
wherein the program, when executed by the hardware processor, causes the image processing apparatus to further perform:
  displaying a result of the associating and storing on the display unit.

8. The storage medium according to claim 1,
wherein the storing comprises:
  specifying the keyword corresponding to the item information stored in the storage unit from the character string based on the acquired character string information,
  acquiring the value information corresponding to the specified keyword from the character string based on the acquired character string information.

9. The storage medium according to claim 1,
wherein the program, when executed by the hardware processor, causes the image processing apparatus to further perform:
  acquiring the image data, and
wherein the acquiring of the character string information comprises acquiring the character string information and the position information from the acquired image data by the OCR.

10. An image processing method comprising:
receiving image data of a receipt image capturing a receipt; and
performing the following procedures automatically after receiving the image data of the receipt image:
  acquiring, from the image data of the receipt image capturing the receipt, character string information which is information of a character string and position information which is information of a position of the character string in the receipt image by an Optical Character Recognition (OCR);
  storing an association data table in a storage unit, the storing comprising:
    acquiring value information which is information of a value corresponding to a keyword from the character string based on the acquired character string information by referring to a keyword data table, the keyword being a character string, the keyword data table storing, for each of a plurality of pieces of item information, the correspondence between the keyword, the item information, and a type of the item information, the plurality of pieces of item information corresponding to a plurality of pieces of displaying item information to be listed in a list in an information list display area of a management image, the keyword data table having been stored in the storage unit before the image data of the receipt image is received, the acquiring of the value information being performed for each keyword stored in the keyword data table; and
    storing, in the storage unit, the association data table in which, for each keyword stored in the keyword data table, the acquired value information corresponding to the keyword, position information corresponding to the acquired value information among the acquired position information, and the item information corresponding to the keyword are associated;
  determining, for each of the plurality of pieces of item information stored in the association data table, whether one value information is associated with the item information or a plurality of pieces of value information are associated with the item information by referring to the association data table;
  deciding, in a case where it is determined that one value information is associated with the item information, that the one value information is a displaying value information, and storing the displaying value information and the item information in association in a receipt data table;
  obtaining, in a case where it is determined that a plurality of pieces of value information are associated with the item information, one value information by executing a processing corresponding to the item information by referring to the keyword data table, deciding that the one value information is a displaying value information, and storing the displaying value information and the item information in association in the receipt data table,
    wherein, in a case where it is determined that the item information is a first type by referring to the keyword data table, a first processing is executed as the processing corresponding to the item information, and
    wherein, in a case where it is determined that the item information is a second type by referring to the keyword data table, a second processing is executed as the processing corresponding to the item information, the second processing being different from the first processing; and
  displaying, on a display unit capable of displaying an image, the management image by referring to the receipt data table and the association data table, the management image including the information list display area and a receipt image display area,
    wherein the information list display area displays the list of the plurality of pieces of displaying item information and the displaying value information which are stored in association in the receipt data table, and
    wherein the receipt image display area displays: the receipt image; and, for the plurality of pieces of item information stored in the association data table, a marker image at a position indicated by the position information which is stored in the association data table and is associated with the item information, the marker image indicating a status corresponding to the item information, and the marker image being different for each item information.

11. An image processing apparatus comprising:
a hardware processor; and
a memory storing computer executable instructions, when executed by the hardware processor, causing the image processing apparatus to perform:
receiving image data of a receipt image capturing a receipt; and
performing the following procedures automatically after receiving the image data of the receipt image:
  acquiring, from the image data of the receipt image capturing the receipt, character string information which is information of a character string and position information which is information of a position of the character string in the receipt image by an Optical Character Recognition (OCR);
  storing an association data table in a storage unit, the storing comprising:
    acquiring value information which is information of a value corresponding to a keyword from the character string based on the acquired character string information by referring to a keyword data table, the keyword being a character string, the keyword data table storing, for each of a plurality of pieces of item information, the correspondence between the keyword, the item information, and a type of the item information, the plurality of pieces of item information corresponding to a plurality of pieces of displaying item information to be listed in a list in an information list display area of a management image, the keyword data table having been stored in the storage unit before the image data of the receipt image is received, the acquiring of the value information being performed for each keyword stored in the keyword data table; and
    storing, in the storage unit, the association data table in which, for each keyword stored in the keyword data table, the acquired value information corresponding to the keyword, position information corresponding to the acquired value information among the acquired position information, and the item information corresponding to the keyword are associated;
  determining, for each of the plurality of pieces of item information stored in the association data table, whether one value information is associated with the item information or a plurality of pieces of value information are associated with the item information by referring to the association data table;
  deciding, in a case where it is determined that one value information is associated with the item information, that the one value information is a displaying value information, and storing the displaying value information and the item information in association in a receipt data table;
  obtaining, in a case where it is determined that a plurality of pieces of value information are associated with the item information, one value information by executing a processing corresponding to the item information by referring to the keyword data table, deciding that the one value information is a displaying value information, and storing the displaying value information and the item information in association in the receipt data table,
    wherein, in a case where it is determined that the item information is a first type by referring to the keyword data table, a first processing is executed as the processing corresponding to the item information, and
    wherein, in a case where it is determined that the item information is a second type by referring to the keyword data table, a second processing is executed as the processing corresponding to the item information, the second processing being different from the first processing; and
  displaying, on a display unit capable of displaying an image, the management image by referring to the receipt data table and the association data table, the management image including the information list display area and a receipt image display area,
    wherein the information list display area displays the list of the plurality of pieces of displaying item information and the displaying value information which are stored in association in the receipt data table, and
    wherein the receipt image display area displays: the receipt image; and, for the plurality of pieces of item information stored in the association data table, a marker image at a position indicated by the position information which is stored in the association data table and is associated with the item information, the marker image indicating a status corresponding to the item information, and the marker image being different for each item information.

* * * * *

UNITED STATES PATENT AND TRADEMARK OFFICE
CERTIFICATE OF CORRECTION

| | | |
|---|---|---|
| PATENT NO. | : 10,242,410 B2 | Page 1 of 1 |
| APPLICATION NO. | : 14/980502 | |
| DATED | : March 26, 2019 | |
| INVENTOR(S) | : Tomofumi Nakayama | |

It is certified that error appears in the above-identified patent and that said Letters Patent is hereby corrected as shown below:

In the Claims

Column 20, Claim 5, Line 63 should read:
marker image different from the first marker image is Column 21, Claim 6, Line 16 should read:
image displayed at the position corresponding to Column 21, Claim 6, Line 21 should read:
responding to the marker image on which the Signed and Sealed this
Thirteenth Day of August, 2019

Andrei Iancu
*Director of the United States Patent and Trademark Office*